(12) United States Patent
Yushin et al.

(10) Patent No.: US 10,797,310 B2
(45) Date of Patent: Oct. 6, 2020

(54) ELECTROCHEMICAL ENERGY STORAGE DEVICES AND COMPONENTS

(71) Applicant: Sila Nanotechnologies Inc., Atlanta, GA (US)

(72) Inventors: Gleb Yushin, Atlanta, GA (US); Bogdan Zdyrko, Atlanta, GA (US); Eugene Michael Berdichevsky, Atlanta, GA (US)

(73) Assignee: SILA NANOTECHNOLOGIES INC., Alameda, CA (US)

( * ) Notice: Subject to any disclaimer, the term of this patent is extended or adjusted under 35 U.S.C. 154(b) by 1058 days.

(21) Appl. No.: 14/222,312

(22) Filed: Mar. 21, 2014

(65) Prior Publication Data

US 2014/0287301 A1    Sep. 25, 2014

Related U.S. Application Data

(60) Provisional application No. 61/804,166, filed on Mar. 21, 2013, provisional application No. 61/832,114, filed on Jun. 6, 2013.

(51) Int. Cl.

| | |
|---|---|
| *H01M 4/36* | (2006.01) |
| *H01M 10/36* | (2010.01) |
| *H01M 10/42* | (2006.01) |
| *H01M 4/505* | (2010.01) |
| *H01M 4/525* | (2010.01) |

(52) U.S. Cl.
CPC ........... *H01M 4/366* (2013.01); *H01M 10/36* (2013.01); *H01M 10/4235* (2013.01); *H01M 4/505* (2013.01); *H01M 4/525* (2013.01); *H01M 2300/0002* (2013.01)

(58) Field of Classification Search
None
See application file for complete search history.

(56) References Cited

U.S. PATENT DOCUMENTS

| | | |
|---|---|---|
| 8,450,012 B2 | 5/2013 | Cui et al. |
| 8,637,185 B2 | 1/2014 | Berdichevsky et al. |

(Continued)

OTHER PUBLICATIONS

Jong-Hyuk Lee et al., "Effect of Carbon Coating on Electrochemical Performance of Hard Carbons as Anode Materials for Lithium Ion Batteries", Journal of Power Sources 166 (2007) 250-254 (Year: 2007).*

(Continued)

*Primary Examiner* — Carmen V Lyles-Irving
(74) *Attorney, Agent, or Firm* — Muncy, Geissler, Olds & Lowe, P.C.; Daniel Podhajny

(57) ABSTRACT

A battery electrode composition is provided comprising anode and cathode electrodes and an electrolyte ionically coupling the anode and the cathode. At least one of the electrodes may comprise a plurality of active material particles provided to store and release ions during battery operation. The electrolyte may comprise an aqueous metal-ion electrolyte ionically interconnecting the active material particles. Further, the plurality of active material particles may comprise a conformal, metal-ion permeable coating at the interface between the active material particles and the aqueous metal-ion electrolyte. The conformal, metal-ion permeable coating impedes water decomposition at the aforesaid at least one of the electrodes.

21 Claims, 17 Drawing Sheets

(56) References Cited

U.S. PATENT DOCUMENTS

| | | |
|---|---|---|
| 2002/0055040 A1 | 5/2002 | Mukherjee et al. |
| 2004/0197641 A1 | 11/2004 | Visco et al. |
| 2005/0175894 A1 | 8/2005 | Visco et al. |
| 2008/0268339 A1* | 10/2008 | Suzuki ............... H01M 4/131 429/220 |
| 2011/0014522 A1 | 1/2011 | Visco et al. |
| 2011/0123875 A1 | 5/2011 | Issaev et al. |
| 2011/0171502 A1 | 7/2011 | Kottenstette et al. |
| 2011/0311882 A1 | 12/2011 | Kim et al. |
| 2012/0058395 A1* | 3/2012 | Harada ............... H01M 4/131 429/215 |
| 2012/0064407 A1* | 3/2012 | Muthu ............... H01M 4/485 429/217 |
| 2012/0100438 A1 | 4/2012 | Fasching et al. |
| 2012/0202112 A1 | 8/2012 | Yushin et al. |
| 2012/0251886 A1 | 10/2012 | Yushin et al. |
| 2012/0321959 A1 | 12/2012 | Yushin et al. |
| 2012/0321961 A1 | 12/2012 | Yushin et al. |
| 2012/0328952 A1 | 12/2012 | Yushin et al. |
| 2013/0078510 A1* | 3/2013 | Reynolds ............... B82Y 30/00 429/209 |
| 2013/0224594 A1 | 8/2013 | Yushin et al. |
| 2013/0344391 A1 | 12/2013 | Yushin et al. |
| 2014/0057179 A1 | 2/2014 | Yushin et al. |

OTHER PUBLICATIONS

International Search Report and Written Opinion dated Aug. 18, 2014 in International Application No. PCT/US2014/031494.

G. Yushin et al., "Deformations in Si—Li Anodes Upon Electrochemical Alloying in Nano-Confined Space," Journal of the American Chemical Society, Published on the Web, Jun. 8, 2010.

* cited by examiner

PH SHIFTING AND CHEMICAL BONDING GROUP EXAMPLES

| pH LOWERING GROUPS | pH RISING GROUPS | CHEMICAL BONDING GROUPS |
|---|---|---|
| —S(=O)(=O)—OH | —P(=O)(OLi)(OLi) | epoxide |
| —CF₂—S(=O)(=O)—OH | —C(=O)—OLi | C≡C |
| —S(=O)(=O)—C₆H₄—OH (tosyl) | —N(alkyl)(alkyl) | —N=C=O |
| —CF₂—P(=O)(OH)(OH) | morpholino | —N=C=S |
| —CF₂—C(=O)—OH | N-alkyl piperazine | p-tolyl-N⁺≡N |

FIG. 3

EXAMPLE POROUS PARTICLE DESIGN FOR ACCOMMODATING VOLUME CHANGES

PARTICLE WITH POROUS CORE

CORE WITH SCAFFOLDING MATRIX

SHELL WITH GRADUALLY CHANGING COMPOSITION

ELECTROCHEMICAL ENERGY STORAGE DEVICES AND COMPONENTS

CLAIM OF PRIORITY UNDER 35 U.S.C. § 119

The present application for patent claims priority to Provisional Application No. 61/804,166 entitled "ELECTROCHEMICAL ENERGY STORAGE DEVICES AND COMPONENTS" filed on Mar. 21, 2013, and to Provisional Application No. 61/832,114 entitled "ELECTROCHEMICAL ENERGY STORAGE DEVICES AND COMPONENTS" filed on Jun. 6, 2013, which are expressly incorporated by reference herein.

BACKGROUND

Field

The present disclosure relates generally to energy storage devices, and more particularly to metal-ion battery technology and the like.

Background

Among the metal-ion batteries, Li-ion battery technology has achieved the greatest commercial success, owing to the very high gravimetric capacity (3860 mAh/g) and moderately high volumetric capacity (2061 Ah/L) of Li anodes combined with the high activity of Li and the high mobility of Li ions in various hosts.

Yet, other metal-ion batteries may also offer reasonably high volumetric and gravimetric energy densities. For example, the gravimetric specific capacity of Al (2980 mAh/g, calculated based on the three-electron oxidation of Al) is close to that of Li, while its volumetric storage capacity (8043 Ah/L) is four times higher than that of Li, due to the fivefold higher density of Al. The excellent storage capacity of Al combined with its broad availability (Al is the most abundant metal in the Earth's crust, contributing to over 8% of the total mass) and low cost, makes it an attractive anode material. Similarly, Mg, for example, is nearly as abundant as Al, but it is more active than Al and has high gravimetric (2233 mAh/g) and volumetric (3885 Ah/L) specific storage capacities. Na-ion and Ca-ion batteries may also offer some advantages in selected applications. Finally, batteries that combine metal cations and non-metal anions may also be utilized in various applications.

Unfortunately, current Li-ion battery technology utilized for transportation, grid storage, and electronic device fields is expensive, slow, and unsafe. Such cells utilize organic electrolytes and suffer from several limitations. Formation of Li dendrites in commercial batteries is particularly challenging to detect and prevent. When formed, they may lead to internal shorts, which give rise to local heating, melting of the separator, thermal runaway, and eventually fire. The high flammability of organic electrolytes does not help this situation. In addition, decomposition of organic electrolytes with the presence of water and other impurities limit the cycle life of Li-ion batteries and make their assembling expensive. Further, the relatively low ionic conductivity of organic electrolytes combined with the low ionic conductivity of the solid electrolyte interphase (SEI) limits the power performance of Li-ion batteries.

The use of aqueous chemistry may significantly improve the safety of Li-ion battery technologies, and, at the same time, reduce the cost of Li-ion cells and corresponding battery packs. However, the use of aqueous electrolytes is known to typically limit the maximum voltage of aqueous Li-ion and other metal-ion batteries to below around 1.2-1.5V. This low voltage limits the energy density of the cells.

In addition, the electrode fabrication and cell construction developed for conventional Li-ion chemistry utilizing organic electrolytes is very expensive. Adoption of similar manufacturing technology for aqueous Li-ion cells will increase their manufacturing cost.

Accordingly, there remains a need for improved aqueous metal-ion batteries, components, and other related materials and manufacturing processes.

SUMMARY

Embodiments disclosed herein address the above-stated needs by providing improved aqueous metal-ion (such as Li-ion) battery components, improved batteries made therefrom, and methods of making and using the same. Such aqueous metal-ion batteries facilitate the incorporation of advanced material synthesis and electrode fabrication technologies, and enable fabrication of high voltage and high capacity aqueous metal-ion batteries at a cost lower than that of conventional Li-ion battery technology.

A battery electrode composition is provided comprising anode and cathode electrodes and an electrolyte ionically coupling the anode and the cathode. At least one of the electrodes may comprise a plurality of active material particles provided to store and release ions during battery operation. The electrolyte may comprise an aqueous metal-ion electrolyte ionically interconnecting the active material particles. Further, the plurality of active material particles may comprise a conformal, metal-ion permeable coating at the interface between the active material particles and the aqueous metal-ion electrolyte. The conformal, metal-ion permeable coating impedes water decomposition at the aforesaid at least one of the electrodes.

The conformal, metal-ion permeable coating may have an average thickness is in the range of about 10 nm to about 500 nm. The conformal, metal-ion permeable coating may encase each of the active material particles individually. Alternatively or in addition, the conformal, metal-ion permeable coating may encase the plurality of active material particles as a whole. In some designs, the conformal, metal-ion permeable coating may be generally uniform, while in other designs it may have a non-uniform composition that changes gradually with radial distance (e.g., from an inner surface to an outer surface). In this case, a more chemically and mechanically robust coating may be formed.

In various embodiments, the conformal, metal-ion permeable coating may be a composite coating comprising a plurality of layers. For example, the plurality of layers may comprise an outer layer formed from an electrical insulator material for preventing electrochemical reduction of the aqueous metal-ion electrolyte on the anode or preventing electrochemical oxidation of the aqueous metal-ion electrolyte on the cathode. This may be achieved by the insulative outer layer accommodating a portion of the voltage drop between the anode and cathode, thereby reducing the voltage drop across the aqueous metal ion electrolyte. In other examples, the plurality of layers may comprise an electrically conductive layer for electrically connecting the active material particles, an interfacing layer for enhancing uniformity or adhesion of another layer, a mechanically stable layer for enhancing mechanical stability of the conformal, metal-ion permeable coating, or a supplemental protection layer for preventing electrochemical reduction of the aqueous metal-ion electrolyte on the anode or preventing electrochemical oxidation of the aqueous metal-ion electrolyte on the cathode.

In some applications, the conformal, metal-ion permeable coating may comprise, as a single or outer layer, a chemically-linked, polymeric coating containing one or more pH-regulating functional groups. As an example, the one or more pH-regulating functional groups may comprise an acidic functional group for decreasing the pH (e.g., to pH of approximately 4 or below) of active particles at the cathode to prevent electrochemical oxidation of the aqueous metal-ion electrolyte. As another example, the one or more pH-regulating functional groups may comprise a basic functional group for increasing the pH (e.g., to pH of approximately 9 or above) of active particles at the anode to prevent electrochemical reduction of the aqueous metal-ion electrolyte. In either case, the one or more pH-regulating functional groups may be borne by one or more polymers attached to the surface of the active material particles.

In some designs, the conformal, metal-ion permeable coating may be formed on the aforesaid at least one of the electrodes prior to a formation cycle of a cell comprising the battery composition, while in other designs it may be at least partially formed on the aforesaid at least one of the electrodes by decomposition of one or more additives to the aqueous metal-ion electrolyte during a formation cycle of a cell comprising the battery composition. That is, the coating layer(s) can be deposited on the electrode surface either (1) prior to assembling of the cell or (2) formed in-situ during the so-called formation cycle(s) of the cell when additive(s) to an aqueous electrolyte decompose at a potential where water does not yet decompose, thus forming a protective coating on the electrode surface, or (3) both.

In different designs, the conformal, metal-ion permeable coating may comprise (i) a carbon or (ii) one or more metals that enhance over-potential for water decomposition by at least 0.25 V. The conformal, metal-ion permeable coating may also comprise a plurality of pores having an average pore size in the range of about 0.5 nm to about 10 nm.

The active material particles may be composites with a core-shell structure. The core of each active material particle may be, for example, a nanocomposite comprising active material and at least one of (i) pores, (ii) a carbon additive, or (iii) a carbon scaffolding matrix. The carbon scaffolding matrix may be porous with an average pore size in the range of about 0.5 nm to about 20 nm, and may contain active material that at least partially fills the pores. The shell of each active material particle may be, for example, a nanocomposite comprising at least one of (i) an electrical conductive layer, (ii) a mechanical stability layer, or (iii) a water impermeability layer.

In general, the metal-ion battery may correspond to an aqueous Li-ion battery, or other such aqueous metal-ion batteries.

Various methods of fabricating a battery electrode composition comprising active particles are also provided. They may comprise, for example: providing active material particles to store and release ions during battery operation; electrically connecting the active particles with a current collector; forming a conformal protective coating on the electrode surface in such a way that the electrode remains porous while all (or at least a substantial portion) of its open pore surface area is covered with such a coating. For connecting the active particle together during the electrode fabrication, the method may involve mixing the active particles with a binder and annealing at an elevated temperature to cause solidification of the bonded particles in a particular shape. In some embodiments, the surface of the active particles may allow sintering particles together at elevated temperatures and thus not require a binder.

In some embodiments, the shape of the produced electrodes may be planar (for sandwich-type electrode stacking with a separator layer in between positive and negative electrodes). In other embodiments, the shape of the produced electrodes may be cylindrical (for cylindrical cell fabrication with a cylindrical electrode in another hollow cylinder electrode and a cylindrical separator layer in between cylindrical positive and negative electrodes).

BRIEF DESCRIPTION OF THE DRAWINGS

The accompanying drawings are presented to aid in the description of embodiments of the invention and are provided solely for illustration of the embodiments and not limitation thereof.

FIG. 3 provides examples of various pH shifting and chemical bonding groups that may be used in conjunction with the cell design of FIG. 2.

DETAILED DESCRIPTION

Figure 1:
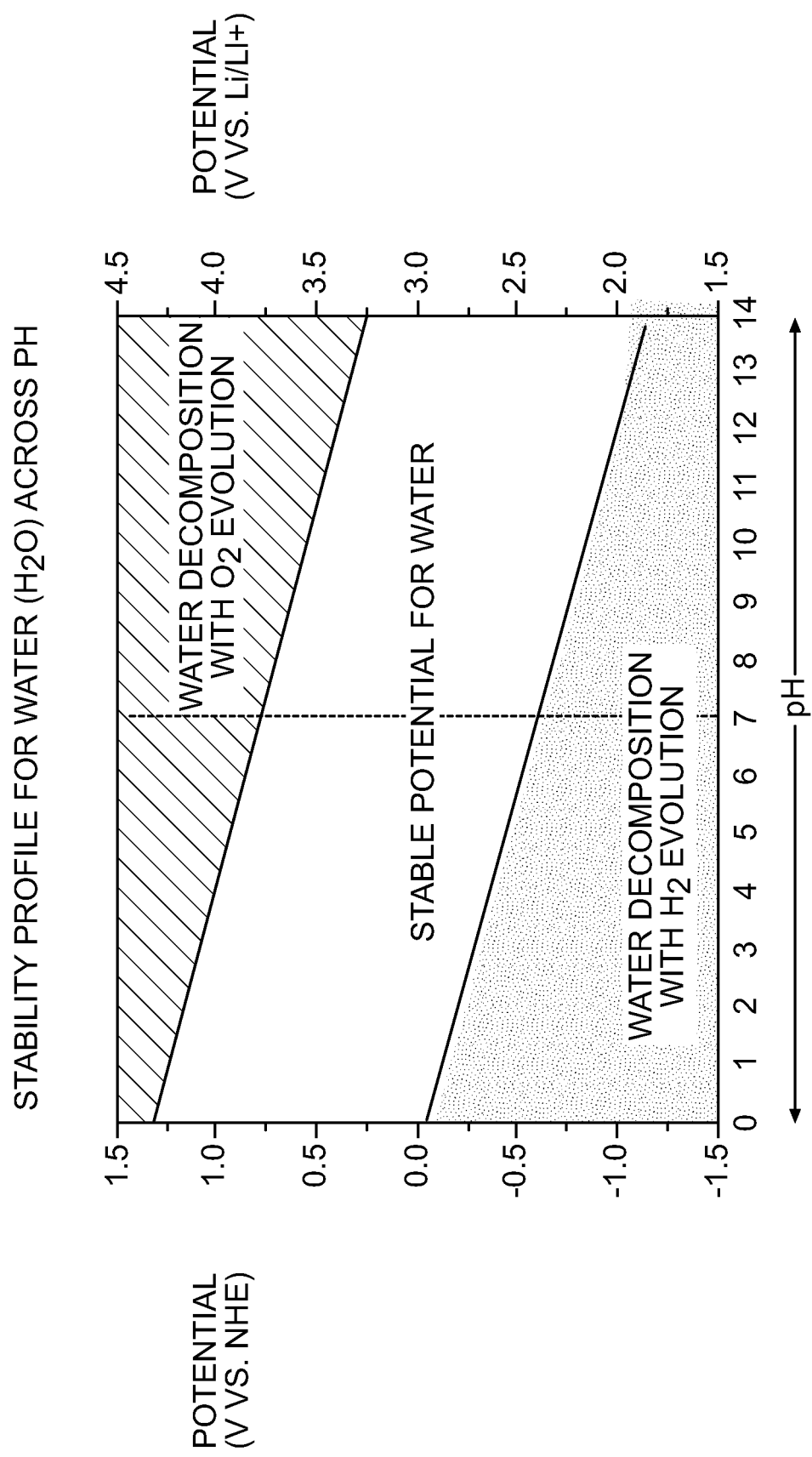
FIG. 1 illustrates a stability profile for water ($H_2O$) across pH.

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details.

Aqueous metal-ion (such as Li-ion) technology may offer enhanced safety, enhanced power performance and reduced cost compared to traditional Li-ion technology that utilizes organic electrolyte(s). Organic electrolytes used in conventional Li-ion batteries exhibit specific Li-ion conductance of up to about 3 mS/cm. In contrast, Li ions in aqueous solutions exhibit conductance of about 75 mS/cm. Thus, for the same electrodes and current rate, organic electrolytes may induce about a twenty-five times higher polarization. Therefore, Li-ion battery cells with aqueous electrolyte(s) may operate at more than an order of magnitude higher current densities and accordingly provide an order of magnitude higher power. Conversely, for the same power performance, aqueous Li-ion batteries may utilize thicker electrodes.

The key bottlenecks in the development of stable, low-cost, aqueous Li-ion technology, however, include: (i) a low thermodynamically stable voltage range for aqueous electrolytes; (ii) the absence of stable electrode materials that offer high capacity; and (iii) high cost and poor compatibility of traditional Li-ion cell manufacturing techniques with aqueous Li-ion technologies.

The improvements in aqueous Li-ion battery technology described herein address the above-noted challenges, and may be implemented via one or more of several complimentary techniques, including but not limited to: (1) different techniques for increasing the voltage stability range of pH-neutral aqueous electrolytes by forming ion-permeable coatings on the electrode surface that impede aqueous electrolyte decomposition as well as the resulting gas generation and self-discharge; (2) different techniques for reducing the cost of electrode fabrication and aqueous cell assembling; and (3) different techniques for forming advanced nanostructured high-capacity electrodes compatible with aqueous chemistry.

In the description below, several examples are provided in the context of aqueous Li-ion batteries because of the current prevalence and popularity of Li-ion technology. However, it will be appreciated that such examples are provided merely to aid in the understanding and illustration of the underlying techniques, and that these techniques may be similarly applied to various other metal-ion batteries, such as aqueous Na-ion, aqueous Ca-ion, aqueous K-ion, aqueous Mg-ion, and other aqueous metal-ion batteries.

In addition, various aspects of the present disclosure may be applied to various aqueous electrochemical capacitors, aqueous pseudocapacitors, aqueous Li-ion capacitors, aqueous asymmetric supercapacitors, hybrid electrochemical capacitor-battery devices (where one of the electrodes is battery-like, while the other is electrochemical capacitor-like), and other aqueous electrochemical energy storage devices in order to enhance their performance (for example, to enhance maximum charge voltage or to reduce leakage current, or both). Further, various aspects of the present disclosure may also be applied to electrochemical energy storage devices based on non-aqueous electrolytes.

According to different embodiments, various aspects of the present disclosure may be applied to both the positive electrode and the negative electrode of aqueous electrochemical energy storage devices, or to the electrodes individually (either the positive electrode or the negative electrode). Application to only one of the electrodes may be used to prevent aqueous electrolyte decomposition on such an electrode. For example, application to a cathode in particular may help prevent oxygen evolution at higher potentials. Application to an anode in particular may help prevent hydrogen evolution at lower potentials.

Several methods are described below to enhance the aqueous electrolyte stability voltage range. For example, in a first method, a pH modification of the electrode surface may be implemented. This may be particularly beneficial for pH-neutral aqueous electrolytes. In a second method, a conformal coating may be formed on the electrode surface to account for some of the voltage drop between the electrodes, allowing liquid electrolyte to be maintained within a stable potential range. This may be generally applied to electrolytes other than pH-neutral aqueous electrolytes.

FIG. 1 illustrates a stability profile for water ($H_2O$) across pH. As shown, at high potentials, $H_2O$ decomposes with $O_2$ evolution, and at low potentials, with $H_2$ evolution. The potential of $H_2O$ oxidation at the cathode, $2\ H_2O \rightarrow O_2(g) + 4H^+ + 2e^-$, is governed by the Nernst equation and can be increased to above 1.2 V (vs. NHE) at low pH values. Similarly, the potential of $H_2O$ reduction at the anode, $2H^+ + 2e^- \rightarrow H_2(g)$ or $H_2O + 2e^- \rightarrow H_2(g) + 2OH^-$, can be reduced to below $-1$ V (vs. NHE) at high pH values.

Figure 2:
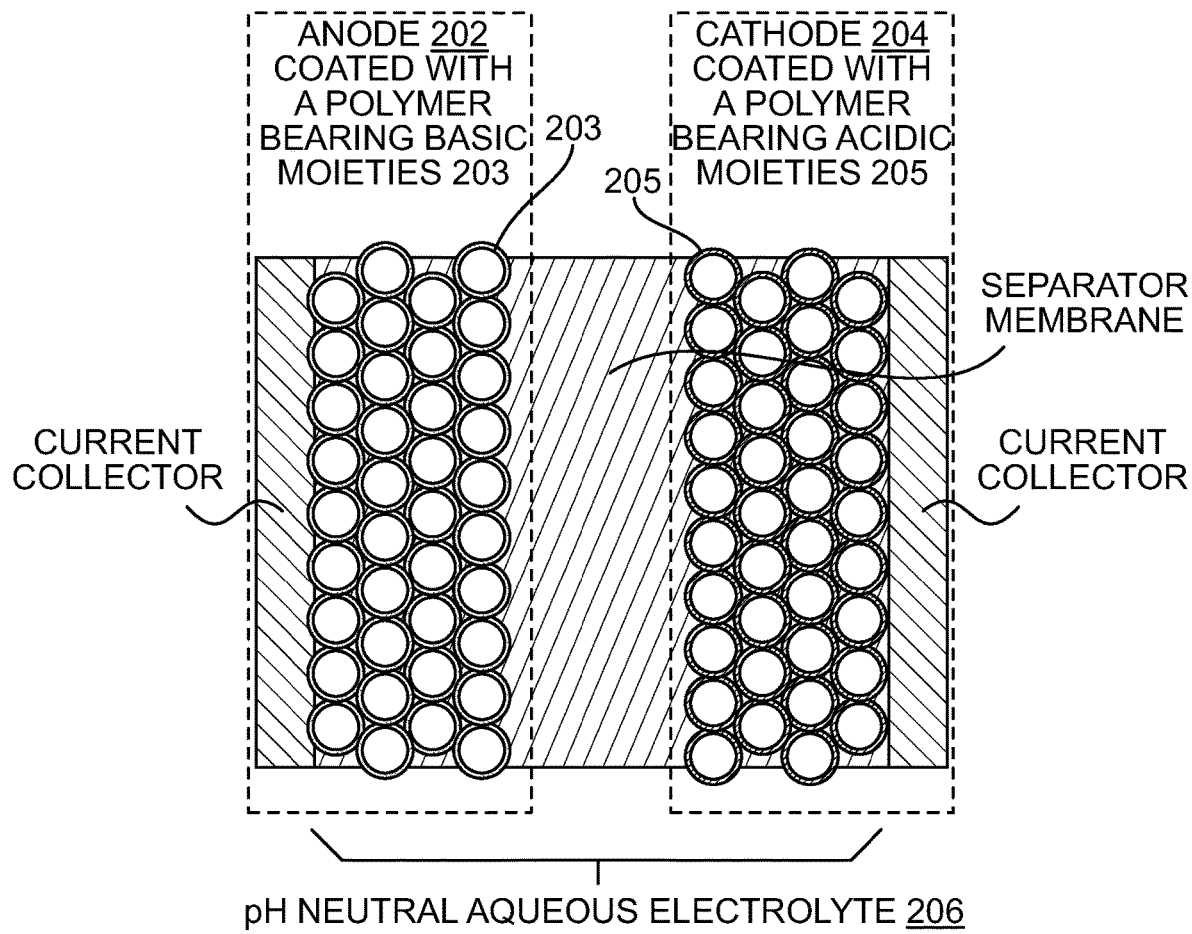
FIG. 2 illustrates an electrochemical cell design for localizing pH at the electrodes to enhance the aqueous electrolyte stability voltage range.
Figure 2:
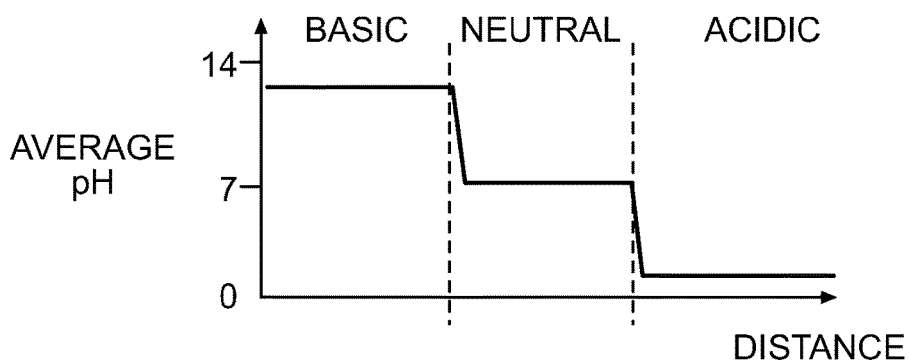

FIG. 2 illustrates an electrochemical cell design for localizing pH at the electrodes to enhance the aqueous electrolyte stability voltage range. In this design, the surfaces of both electrodes, including an anode 202 and a cathode 204, are functionalized with pH-tuning moieties 203, 205 of macromolecules without changing the pH in the bulk of a pH-neutral aqueous Li-ion electrolyte solution 206 (such as solutions of $Li_2SO_4$, LiCl, $LiNO_3$, or other Li salts in $H_2O$).

This design is advantageous in that the local pH value can be independently adjusted at the surface of each electrode via the pH-tuning moieties confined to the surfaces of corresponding electrodes. Polymers or macromolecules bearing these functional moieties have been found to be particularly useful for this purpose. Such macromolecules can be physically or chemically attached to the surface of the electrode material, affecting the pH value only locally, without changing the pH in the bulk of the battery electrolyte solution (as is further illustrated in corresponding average pH distribution shown in FIG. 2).

FIG. 3 provides examples of various pH shifting and chemical bonding groups that may be used in conjunction with the cell design of FIG. 2. The decrease of pH in the vicinity of the electrode can be achieved by attaching polymer-bearing acidic groups, such as carboxylic, phosphoric, or sulfuric moieties. For simplicity, such polymers may be referred to as "acidic." Depending on the pKa of the acidic group in the polymer, the local pH value can be tuned in wide ranges from about pH=6 to about pH=0. Among the above-mentioned acids, sulfuric acid is the strongest (with pKa less than 1), thus providing the largest local pH shift. In order to shift the pH near the battery electrodes into basic conditions, polymers bearing amine moieties in their structure can be used. For simplicity, such polymers may be referred to as "basic." Depending on the pKa of the amine used, the local pH values can be varied from about pH=7 to about pH=12. Another way to increase the local pH is to bind a weak acid polyanion (polymer containing weak acidic groups) salt of a strong base. In the case of an aqueous Li-ion battery, the choice of a strong base is predefined to be LiOH. Due to hydrolysis, salts formed from a strong base and a weak acid will increase pH locally.

Long-term stability of the pH-modifying coatings may be enhanced by chemical bonding to the particle surface and/or coating cross-linking (e.g., via the chemical bonding groups shown in FIG. 3). To obtain a pH modifying polymer capable of chemically bonding to the electrode surface, two monomers may be co-polymerized. One co-monomer may bear a pH-modifying group. The second co-monomer may contain in its structure a chemical group capable of forming covalent bonds with particles of active materials. By changing the ratio between the two co-monomers, the bonding and pH tuning properties of the polymer coating can be tuned for more optimized electrode performance.

Figure 4:
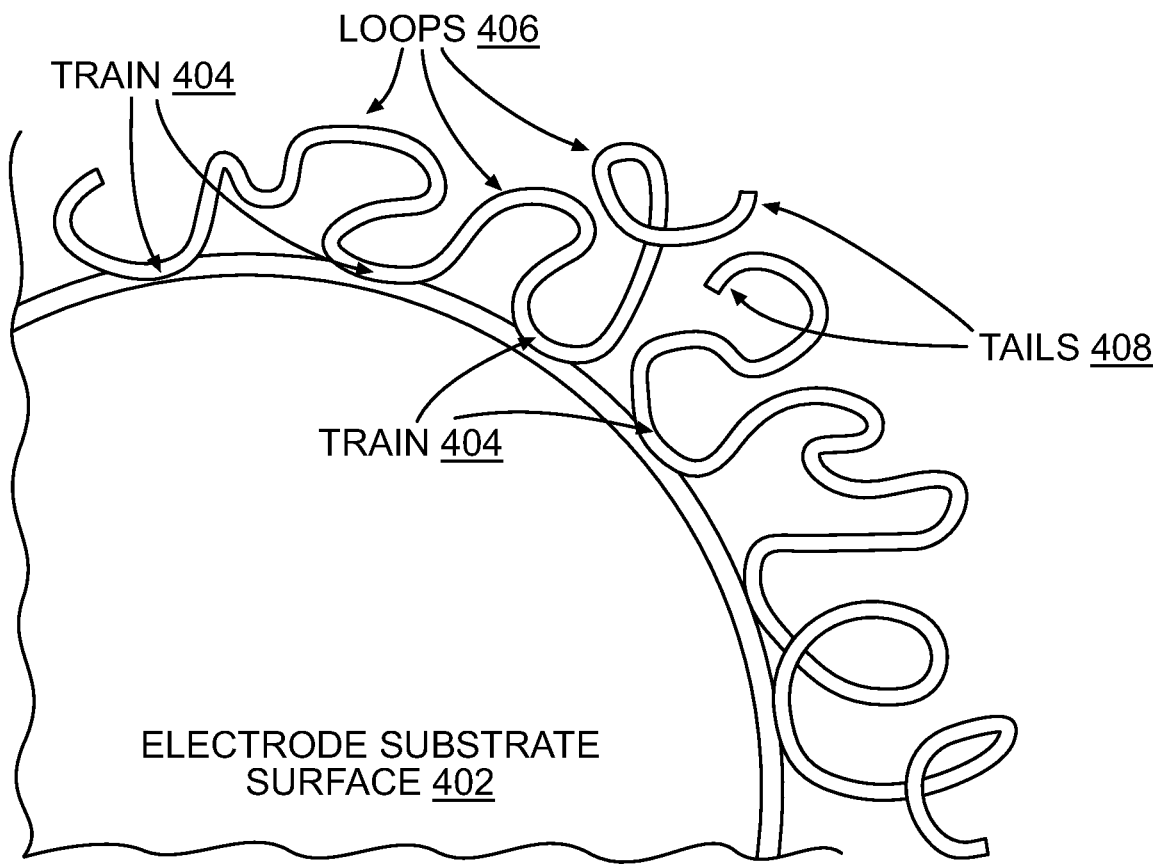
FIG. 4 is a schematic view of polymer chain adsorption of a pH-modifying coating on an electrode substrate surface.

FIG. 4 is a schematic view of polymer chain adsorption of a pH-modifying coating on an electrode substrate surface. The polymeric chemistry of the pH-modifying coating will provide long-term stability. When polymers are adsorbed, they form multiple contacts with the surface 402 called "trains" 404, as shown. "Loop" sections 406 and "tail" sections 408 are not connected to the substrate. On average, the train fraction for relatively high molecular weight polymers adsorbed on the surface may be about 0.15-0.25 and 3-4 monomeric units may be involved in each train section. This means that a polymer chain with a typical degree of polymerization N=1,000 has at least (0.15)*(3)*(1000)=450 contacts with the surface. Despite each contact being a relatively weak bond, the large number of the contacts results in very strong interaction between the surface and the polymer molecule, often exceeding the strength of covalent bonds.

The pH-tuning polymers may be utilized as an additional surface coating on the surface of metal-ion battery electrodes or as binders used in the preparation of battery electrodes. Epoxy groups have been found to be particularly suitable for permanent chemical attachments to various surfaces. In particular, they can react with metal oxides to form chemical bonds between metal oxide and pH-modifying polymers. Similarly, epoxy groups are capable of binding with functionalities intrinsically present on carbon surfaces, such as carboxyl groups. In order to induce cross-linking of the polymer coatings, carbon-carbon double bonds within the polymer structure can be utilized.

In some applications, it may be important for the produced coatings to remain permeable to electrolyte solvent (such as water in the case of aqueous metal-ion batteries). The pH-modifying units located in the "loops" and "tail" sections of the attached polymer coating are not linked to the surface. These groups are polar, and, therefore, are easily hydrated by water molecules providing both the required pH shift and, equally important, channels for easy active ion migration in and out of the active electrode material. From the ratio of "trains" to "loops" (e.g., 0.15-0.25 to 0.85-0.75) in the polymer macromolecule coatings, it can be estimated that about 75-85% of the particle surface will have free access for active ions. Therefore, formation of the polymer coatings may have a very minor effect on the power characteristics of the aqueous metal-ion batteries.

Figure 5:
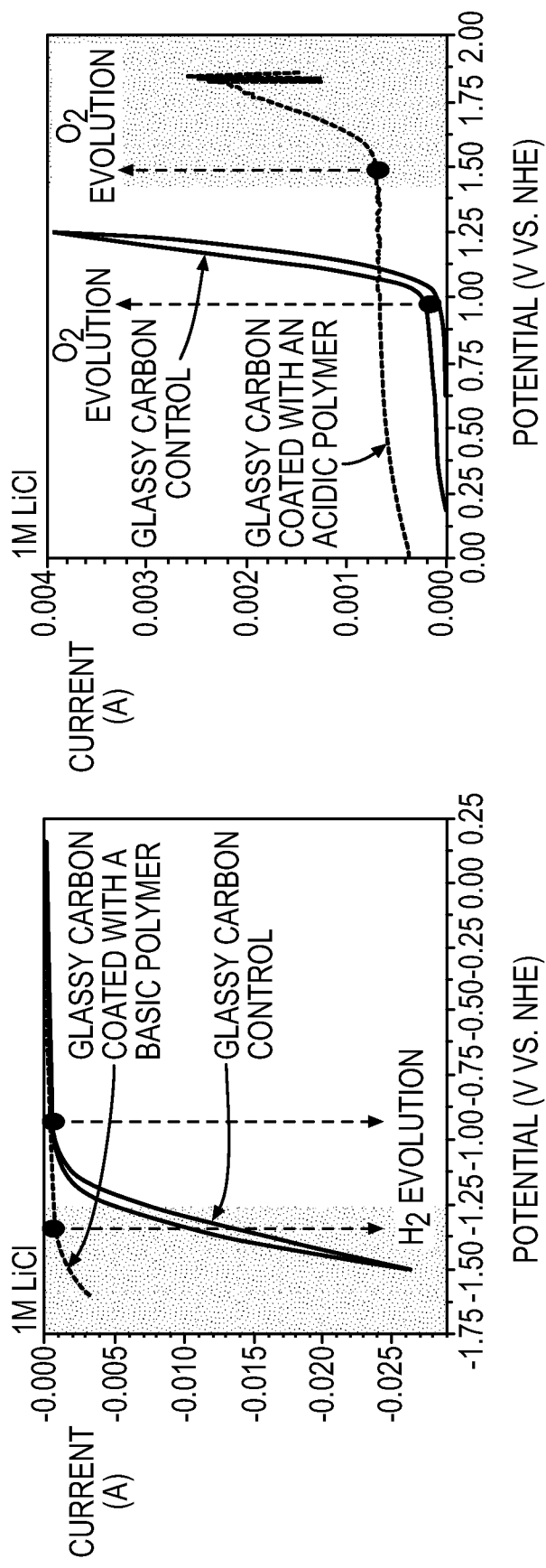
FIG. 5 provides two graphs illustrating the impact of pH-regulating coatings on the electrochemical stability of a pH-neutral aqueous electrolyte.

FIG. 5 provides two graphs illustrating the impact of pH-regulating coatings, on the surface of glassy carbon working electrodes, on the electrochemical stability of a pH-neutral aqueous electrolyte (1M LiCl) measured in a 3-electrode configuration. On the left, it can be seen that the voltage stability range is expanded to below −1.2 V vs. NHE by coating a carbon surface with a polymer bearing basic moieties. On the right, it can be seen that the voltage stability range is expanded to over 1.5 V vs. NHE by coating a carbon surface with a polymer bearing acidic functional moieties. The higher current observed for the carbon surface with a polymer bearing acidic functional moieties is likely related to the pseudo-capacitance induced by the acidic functional groups of the polymer coating.

It will be appreciated that pH-modifying coatings may be deposited directly on the surface of active particles or on the surface of another layer that coats the active particles and may additionally serve various other functions, such as, for example, additionally prevent water decomposition on the electrode surface, prevent degradation of active material, improve electrical conductivity within the electrode, or improve the interface between the active particles and the pH-modifying coating, to name a few.

As discussed above, it will be appreciated that pH-modifying coatings may be used for other chemistries of anodes and cathodes as well as for electrochemical capacitor applications and hybrid devices.

In some applications, in order to further minimize $H_2$ evolution, anodes may additionally be provisioned with microporous and mesoporous additives, capable of proton and $H_3O^+$ adsorption, and known to prevent water decomposition at low potentials. Such additives may be provided in the form of a coating around the active particles (or electrode) or in the form of individual particles, or even in the form of electrolyte additives.

In some configurations, electrolyte additives may be used to create oxide/hydroxide coatings with a basic nature deposited on top of the electrodes. For example, in the case of metal nitrates as additives to the battery electrolyte, metal oxide/hydroxide coatings can be formed during electro-reduction at the electrode. Ions of, for example, $Mg^{2+}$, $Al^{3+}$, $Cr^{3+}$, $Fe^{3+}$, $Mn^{3+}$, and $Co^{2+}$, can be reduced during the process. However, this approach may not be applicable to nitrates of metals such as Cu, Tl, Bi, and Pb, and yields only metal deposits. Utilization of perchlorate salts of Cu, Tl, Bi, and Pb results in hydroxide/oxide film formation during electro-reduction.

Another method for synthesizing oxide films is metal-ion galvanostatic reduction in the presence of hydrogen peroxide. Coatings consisting of $ZrO_2$, $Al_2O_3$, $Al_2O_3$—$ZrO_2$, and $Al_2O_3$—$Cr_2O_3$ can be made by this approach.

Oxide coatings on the battery electrode can be obtained, for example, by a two-step process. In the first step, a metal coating may be deposited on the electrode by electroplating. In the second step, the metal coating may be converted into an oxide by electro-oxidation. Oxides of the metal, which can be electrodeposited from aqueous solutions, can be deposited in this way.

The desired coating porosity and enhanced proton adsorption can be achieved by gentle heat treatment in the case of hydroxide coatings. Heat treatment leads to partial dehydration of the coating, creating porosity. A deposition regime (e.g., galvanostatic, potentiostatic, current pulsing, or voltage pulsing) can also be utilized for the creation of microporosity in the coatings.

In some applications, porous metal (or porous carbon) coatings or porous metal (or porous carbon) powder may efficiently prevent $H_2$ evolution on the anode or $O_2$ evolution on the cathode. Several metals are known to offer high over-potentials for $H_2$ and $O_2$ evolution, and have been found to be useful as additives for aqueous Li-ion batteries. For example, iron (Fe) increases the potential of $O_2$ generation at the cathode by about 0.75 V, nickel (Ni) by 0.56 V, lead (Pb) by 0.81 V, and graphite by 0.95V. Other metals, for example zinc, bismuth, and mercury, also significantly increase the potential of water decomposition at the cathode. All these materials can be used as coatings or as a powder in cathode construction. Similarly, several metals decrease the increase of $H_2$ generation at the anode. For example, graphite, lead, zinc, mercury, and bismuth lower the potential of water decomposition and $H_2$ evolution on the anode by at least 0.6 V. All these materials can be used as coatings or as a powder in cathode construction. In some configurations, the presence of micropores and mesopores within such materials has been found to further prevent water decomposition.

In some configurations (for example, when it is advantageous to reduce the cost of the electrode fabrication or to increase the electrode density), the coating of conductive carbon or selective metal(s) may preferably be not porous.

Figure 6:
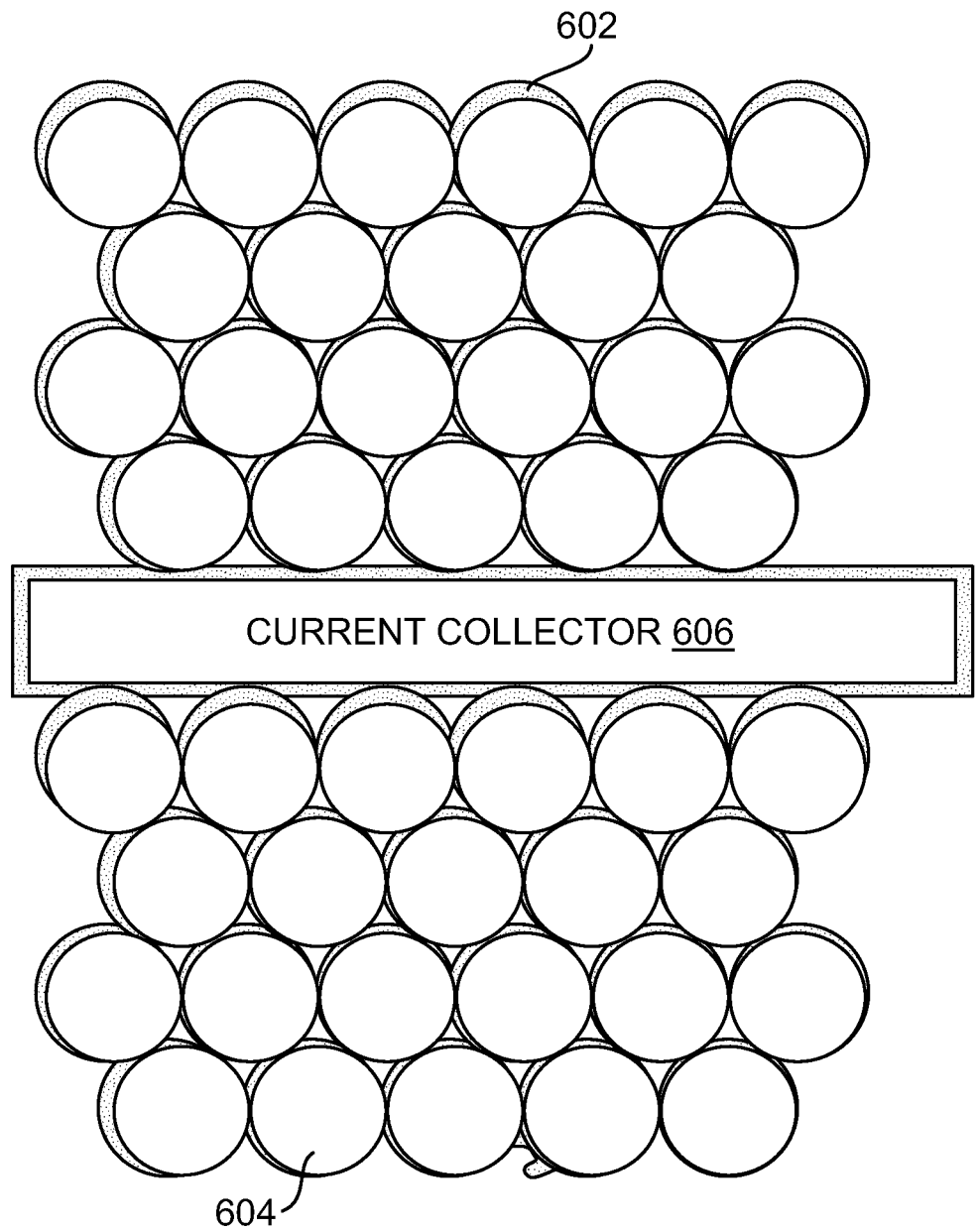
FIG. 6 is a cross-sectional view of an electrode illustrating the use of an electrically insulative but ionicially conductive conformal coating.

FIG. 6 is a cross-sectional view of an electrode illustrating the use of an electrically insulative but ionicially conductive conformal coating. In this example, a thin protective coating 602 is provided to cover the electrode surface via active particles 604 electrically connected to a current collector 606. In some applications, it may be advantageous to form such a conformal, electrically insulative (i.e., essentially or substantially impermeable to electrons) but ionically conductive (i.e., essentially or substantially permeable to ions participating in energy storage) conformal coatings on the surface of electrodes for aqueous meal-ion batteries.

Conventionally, the voltage between the anode and the cathode of an aqueous cell is applied across an aqueous electrolyte layer. When such a voltage exceeds some critical value (often in the range of about 0.6 V to about 1.9 V) water decomposition takes place with oxygen evolution on the cathode or hydrogen evolution on the anode, or both. However, if one or both electrodes are coated with a thin electrically insulative but ionically conductive protective layer, this voltage drops across both the electrolyte and the protective layer in series. This provides a particular advantage for stabilizing an aqueous electrolyte against decomposition.

Figure 7:
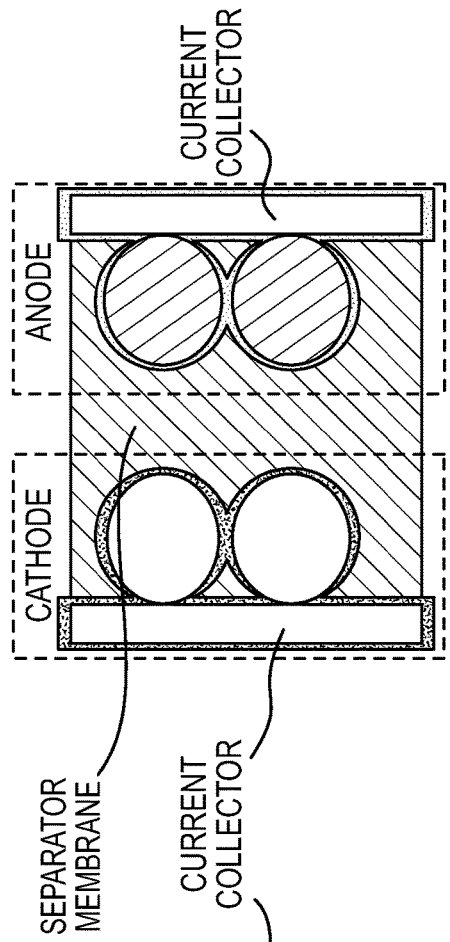
FIG. 7 illustrates the voltage drop between the anode and the cathode of an aqueous cell with and without a protective coating of the type shown in FIG. 6.
Figure 7:
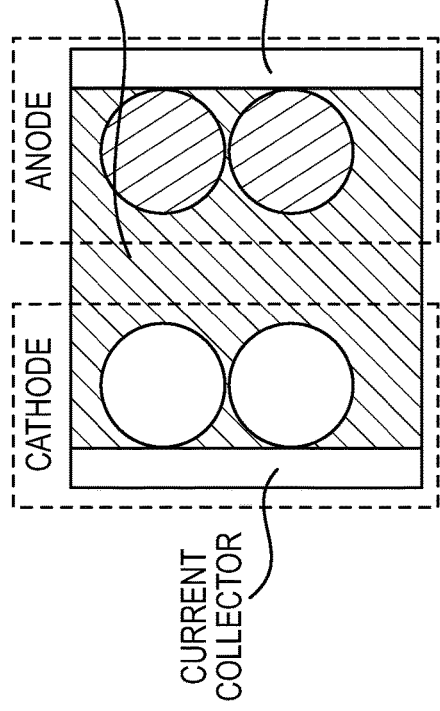
Figure 7:
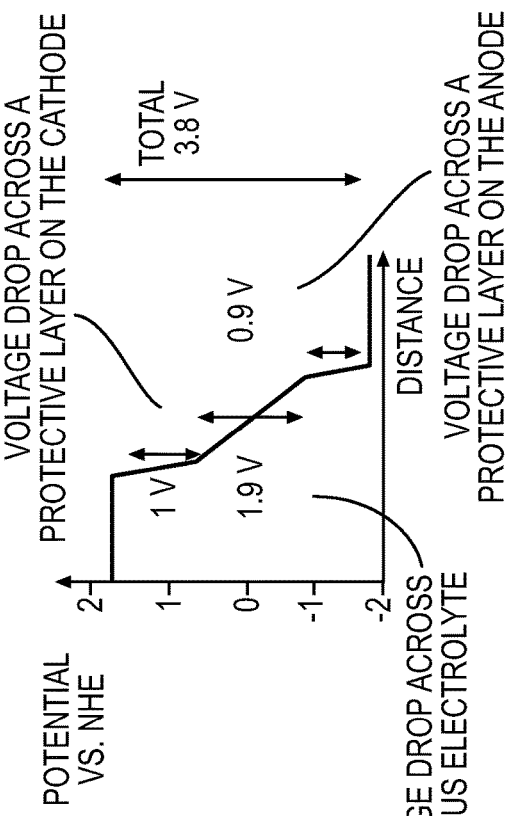
Figure 7:
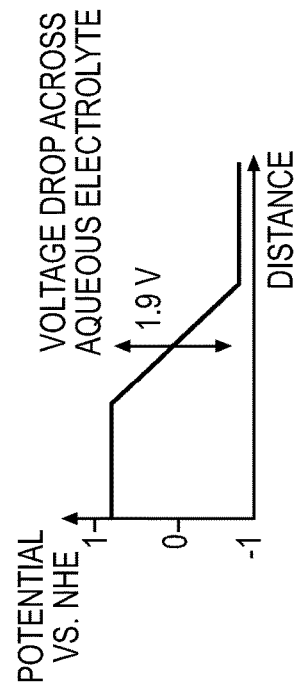

FIG. 7 illustrates the voltage drop between the anode and the cathode of an aqueous cell with and without a protective coating of the type shown in FIG. 6. As shown, if, for example, the total ionic (e.g., Li ion) resistance of this protective layer(s) approximately equals the ionic resistance of the aqueous electrolyte, the voltage drop across the aqueous electrolyte becomes approximately half of the potential difference between the anode and the cathode. If, for example, by using pH modifying moieties on the surface of the protective layer, the stability range of an aqueous electrolyte can approach 1.9 V, then the maximum voltage between the anode and the cathode may safely approach 3.8 V because half of that voltage will be dropped across the protective layer. In this case, the voltage of such an aqueous Li-ion cell, for example, approaches that of the conventional Li-ion cell with an organic electrolyte. This high voltage increases the energy density of the aqueous Li-ion cell, which is particularly important for practical applications.

According to various embodiments, the overall ionic resistance of the protective layer(s) can be adjusted to provide an optimum combination of high total cell voltage, power performance, and reliability. Further, the protective layer may be applied to an anode, a cathode, or both. If applied to an anode, it may prevent hydrogen evolution at low anode potentials. If applied to a cathode, it may prevent oxygen evolution at high cathode potentials.

In many applications, it may be advantageous for this protective layer to uniformly coat the electrolyte-accessible surface of the (porous) electrode. This is because non-uniformities in the layer thickness may induce undesirable variations in the resistivity of the protective layer. If some portion of the protective layer becomes too thin in some area of the electrode, the voltage drop across the aqueous electrolyte may exceed a critical value leading to water decomposition. If some portion of the protective layer becomes too thick in some area of the electrode, it will impede the ion transport in this area, limiting capacity utilization at high current densities. For practical reasons, it may be desirable to have no more than a three-fold variation in the thickness of the protective layer within the protected electrode.

In some applications, it may be advantageous for the overall coating thickness of the protective coating layer to range from about 10 nm to about 500 nm. Thinner coatings may be prone to defects. In some cases, coatings thinner than 5 nm may allow quantum mechanical tunneling of the electrons, which is undesirable as it will permit electro-chemical reduction or oxidation of water at extreme potentials and may prevent the protective coating from function properly. Coatings thicker than 500 nm may impede ion transport or contribute to a significant portion of the total mass or volume, which may also be undesirable.

The ionic conductivity of the protective layer may be made relatively low. For example, when the effective diffusion distance of Li ions in the aqueous electrolyte is 1.6 mm, its ionic resistance (per 1 $cm^2$ area of the electrode) will be equal to $(0.16 \text{ cm})*(1/0.075 \text{ mS cm}^{-1})=2.1$ Ohm, assuming ionic conductance of the aqueous Li electrolyte to be 75 mS/cm. By way of example, consider a design in which the porous electrode surface area is 100 times larger than the geometrical area of the electrode (due to internal porosity) and that this surface is uniformly coated with the protective layer. In this example, the thickness of the protective layer is 20 nm and its resistance is set to 2.1 Ohm. Accordingly, the Li ionic conductance of this layer will be a mere $(0.000002 \text{ cm})/(100)/(2.1 \text{ Ohm}) \approx 10^{-8} \text{ S cm}^{-1}$. When the effective diffusion distance of Li ions in the aqueous electrolyte is larger (e.g., 8 mm for example), the Li ionic conductance of this layer must be even smaller, a mere $\approx 10^{-9} \text{ S cm}^{-1}$. This is a relatively low value, and easy to achieve in many water-compatible ceramic and polymer materials. It does not require development of water-compatible highly conductive solid electrolytes.

The application of such conformal protective coating(s) on the porous electrode surface provides several key advantages over, for example, a thick solid conductive membrane layer that separates the aqueous electrolyte from a solid nonporous electrode or a porous electrode filled with a non-aqueous electrolyte. First, the conformal protective coatings do not require high conductance for providing high overall power performance. Second, in most cases, these coatings are significantly less expensive to deposit because their thicknesses are quite small and because they do not need to possess high ionic conductance. Third, such coatings are more resistant to failure because even if one particle fails (e.g., due to a coating defect) and reacts with the electrolyte, the whole cell can continue to function, losing only a tiny fraction of the overall capacity. Furthermore, as discussed elsewhere herein, the defect may be sealed or repaired during cycling by using additives within the electrolyte. In contrast, the high conductivity thick membranes (typically 10-500 microns) that may, in principle, also be used, suffer from high prices that make them uncompetitive and low conductivity that fail to provide high power performance. More importantly, if a large defect develops within such a membrane, it may ruin the entire cell because the individual particles are not protected.

Formation of the insulative but ionically conductive protective layer conformal coatings on the electrode surface can be performed via electro-reduction (on the anode) or electro-oxidation (on the cathode) of ceramic precursors dissolved in aqueous electrolyte. For example, electro-reduction of the metal ions on the anode can be used to synthesize a variety of metal hydroxide or oxide films. The oxide formation instead of Me electro-deposition can be achieved by bath composition. For example, metal nitrates will yield hydroxide (oxide) films. Examples include, but are not limited to, ions of $Mg^{2+}$, $Al^{3+}$, $Cr^{3+}$, $Fe^{3+}$, $Mn^{3+}$, and $Co^{2+}$. However, salts of Cu, Tl, Bi, and Pb yield only metal deposits in the case of nitrate counter ions. Utilization of perchlorate salts of Cu, Tl, Bi, or Pb results in hydroxide (oxide) formation during electro-reduction.

Another method for synthesizing oxide films is galvanostatic reduction in the presence of hydrogen peroxide. Coatings consisting of $ZrO_2$, $Al_2O_3$, $Al_2O_3$—$ZrO_2$, and $Al_2O_3$—$Cr_2O_3$ can be made by this approach.

Oxide coatings on the battery electrode can be obtained, for example, by a two-step process. In the first step, a metal coating is made by electroplating. In the second step, the metal coating is converted into oxide by electro-oxidation. Oxides of the metal, which can be electrodeposited from aqueous solutions, can be deposited in this way.

Metal oxide/hydroxide films can be generated by oxidation at the cathode. The pH of the electrolyte is chosen in such a way that the lower oxidation state is stable while the higher oxidation state readily undergoes hydrolysis to yield the metal oxide or hydroxide. Examples include, but are not limited to, $MnO_2$, $PbO_2$, $V_2O_5$, $MnO(OH)$, and $CoO(OH)$.

By fine-tuning the applied cell potentials, the oxidizing or reducing power can be continuously varied and suitably selected. Galvanostatic, potentiostatic, and cyclic voltammetry (CV) modes of deposition or their combinations can be utilized for formation of the coating with desired properties.

Formation of the insulative but ionically conductive protective layer conformal coatings on the electrode surface may also be performed via electro-grafting of monomers present in an electrolyte solution. In this case, it is preferable that electro-grafting takes place at potentials where the majority of electrolyte solvent remains stable. In some applications, it may be preferable for the electro-grafting to take place in-situ during the first cycle of the aqueous metal-ion battery. In this case, a monomer should be dissolved in this electrolyte aqueous solution. In some applications, this electro-grafting may be employed as a secondary safety measure; that is, if the pre-deposited coating fails in some part of the electrode or in some part of an active particle due to a manufacturing defect, this water decomposition site will be neutralized by in-situ formation of the grafted layer.

In one example, a vinyl monomer present in the electrolyte solution may be used as a precursor for electro-grafting. Upon battery charging, a negative potential applied to an anode will cause reduction of the double bond of the vinyl monomer, causing anion formation, which, in turn, will cause monomer polymerization and grafting to the electrically conductive electrode (electron conductive) or electrically conductive site(s) on the electrode surface.

Figure 8:
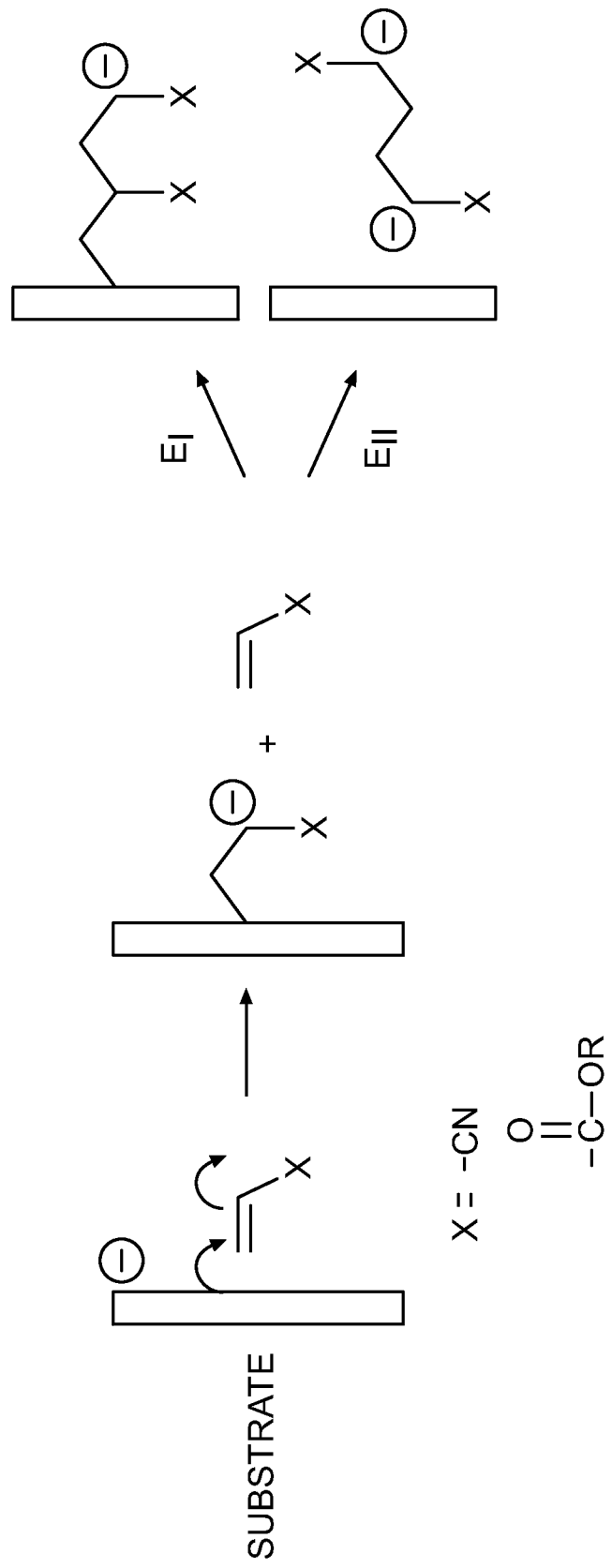
FIGS. 8-10 are schematic illustrations of different examples of in-situ formation of the protective coating layer on an electrode via different suitable precursors.
Figure 9:
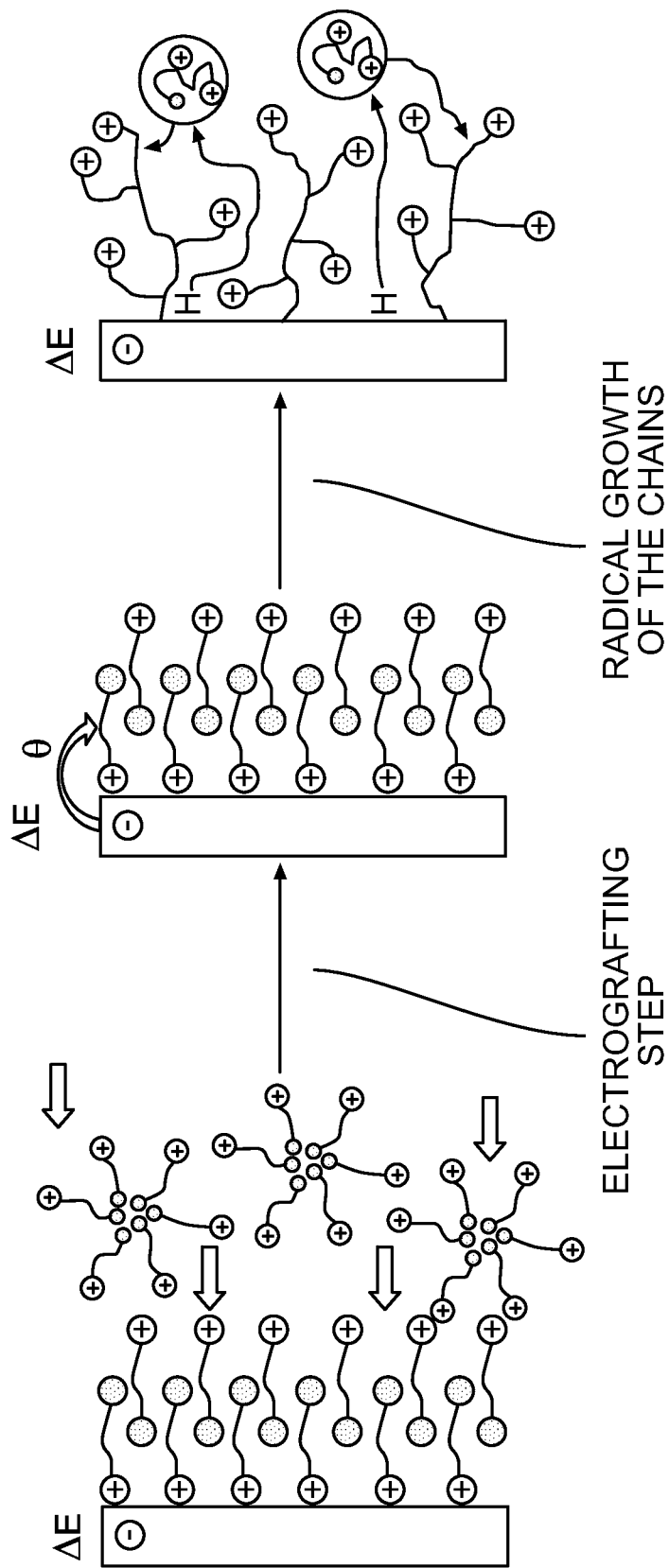
Figure 10:
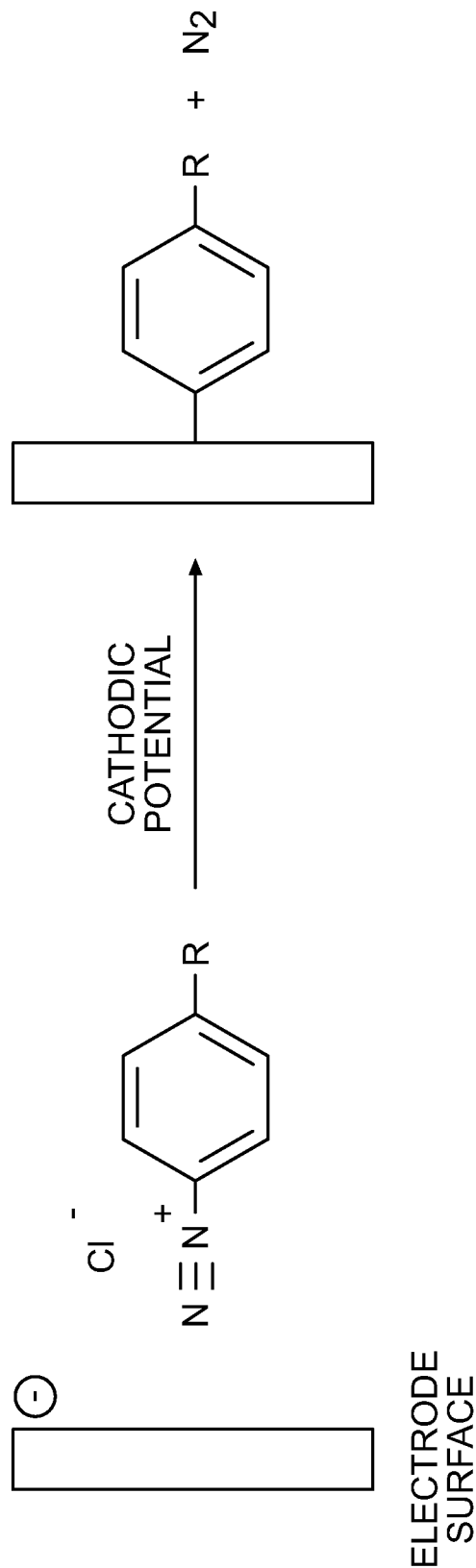

FIGS. 8-10 are schematic illustrations of different examples of in-situ formation of the protective coating layer on an electrode via different suitable precursors.

In one example, acrylonitrile may be electro-grafted on the electrode surface, as shown schematically in FIG. 8. Via proper design of the (meth)acrylate monomers, electro-grafting in water media is also an option, as shown schematically in FIG. 9. Three major structural features of the monomer have been found to be advantageous in this regard: (i) a long hydrophobic alkyl chain capable of expelling water from the electrical double layer of the battery electrode and increasing the electrochemical window of the aqueous electrolyte; (ii) the capping of this chain by a cationic hydrophilic head at one end in order to trigger micellization and desorption to the anode surface; and (iii) the capping of the second chain-end by a polymerizable acrylic fragment.

Other examples of a suitable precursor for the in-situ formation of the protective coating layer on an electrode (such as the anode) are diazonium salts' derivatives. These molecules can be cleaved when electro-reduced on the battery anode, as shown schematically in FIG. 10. The radicals formed as a result of an electron transfer from the conductive anode surface (or conductive site on the anode surface) eventually induce formation of a covalent bond with the electrode. Because the electro-grafted molecules are neutral, no polyaddition reaction occurs (in contrast to the electro-reduction of acrylic monomers). The nature of the substituent R in the aromatic ring can be tuned in order to achieve the desired ionic resistance of the coating layer.

Careful selection of the electro-grafting conditions (such as reagent concentration, grafting potential, and, when grafting is performed in a different cell, pH of the grafting solution) allows for a stable surface layer formation with a desired morphology and precise control of film thickness and ionic resistivity.

Figure 11:
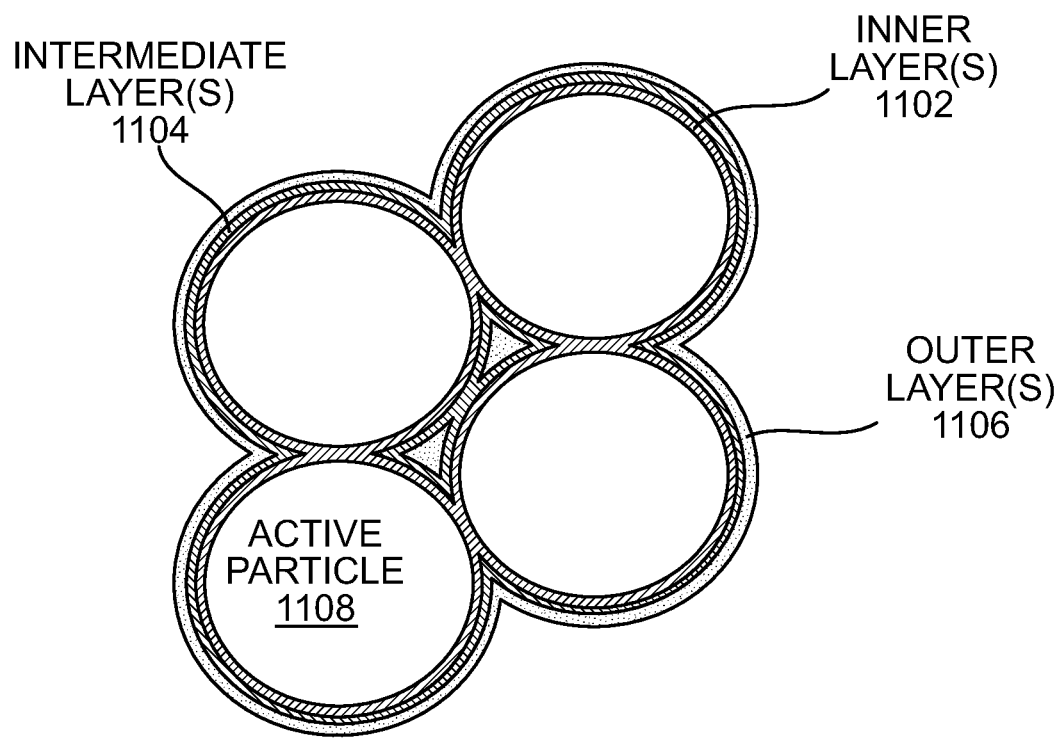
FIG. 11 illustrates an example multi-layer implementation of the protective coating layer impeding aqueous electrolyte decomposition.

FIG. 11 illustrates an example multi-layer implementation of the protective coating layer impeding aqueous electrolyte decomposition. In this example, the multilayer coating structure includes one or more inner layers 1102, one or more intermediate layers 1104, and one or more outer layers 1106 disposed on or around active particles 1108, although it will be appreciated that the number and arrangement of the different layers may vary from application to application as desired. Each of the layers may bear different functions.

An inner layer may be deposited, for example, to assist in electrically connecting active particles of the electrode. In this case, this layer should be made electrically conductive. Examples of materials for such a layer include but are not limited to a conductive carbon coating or a conductive metal coating, which should be stable in the potential range for the electrode of interest. Nickel is an example of such a metal that is suitable for some anodes.

An intermediate layer can also be deposited in order to assist in forming uniform coating of any subsequent layers. Examples of materials for such a layer include but are not limited to metal(s), metal alloy(s), metal oxide(s), metal fluoride(s), metal sulfide(s), various other ceramic coatings, polymer(s), and composite(s), to name a few. It is desirable that this material should also be stable in the potential range for the electrode of interest and not undergo undesirable phase transformation reactions.

Another intermediate layer can also be deposited in order to enhance the mechanical properties of the overall coating or enhance mechanical stability of individual particles. Examples of materials for such a layer include but are not limited to carbon, metal(s), metal alloy(s), metal oxide(s), metal fluoride(s), various other ceramic coating(s), and composite(s), to name a few.

One or more outer layer(s) may be deposited to provide additional protection against aqueous electrolyte decomposition or other useful functions. Examples of materials for such a layer include but are not limited to various metal(s) (as previously described), metal oxide(s), metal fluoride(s), metal sulfide(s), various other ceramic coatings, polymer(s) and composite(s), to name a few. It is desirable that this material should also be stable in the potential range for the electrode of interest and not undergo undesirable phase transformation reactions.

All layers should be permeable to ion transport in order to provide energy storage capability to the active particles. In some applications, it may be preferred that at least one of the layers does not allow electron transport, thus preventing electrochemical reduction of the aqueous electrolyte on the anode or preventing electrochemical oxidation of the aqueous electrolyte on the cathode. In this case, an electrical insulator of sufficient thickness (e.g., typically greater than about 5 nm) should be used to prevent electron tunneling. This function should also be maintained during cycling without forming electron conduction paths by, for example, phase transformation or defect formation.

In some applications, it may be advantageous for the most outer layer to contain pH-regulating moieties that change the local pH in the vicinity of the electrode, thus assisting in preventing aqueous electrolyte decomposition, as described in more detail above.

In some applications, it may be beneficial for some of the coating layer(s) to be deposited on the electrode surface prior to assembling of the cell. In this case, high flexibility can be achieved in both the chemistry and morphology of the layer(s). In some applications, it may be beneficial for at least the outer coating layer(s) to be formed in-situ during the so-called formation cycle(s) of the cell when additive(s) to an aqueous electrolyte decompose at a potential, where water does not yet decompose, thus forming a protective coating on the electrode surface. In this case, the overall cost of the cell fabrication can be reduced. In some applications (for example, when multiple protection mechanisms are desired), the coating layer(s) may be deposited both prior to cell assembling and during cycling. The decomposition of electrolyte additives may also provide a protection against defects formed during electrode handling or during cell operation. Such defects ordinarily allow local undesirable water decomposition in some portion of the electrode, leading to self-discharge, gas generation, and cell degradation. The decomposition of the electrolyte additives may "heal" such defects and allow long-term cycle stability to be achieved.

The coating layer(s) on the electrode surface may be deposited by one or more vapor deposition technique(s), electroless deposition, electrodeposition, dip coating, sol-gel, or other known methods of conformal deposition of coatings.

In some applications, an overall coating thickness (not counting the pH-modifying moieties, if present) in the range of about 5 nm to about 500 nm may be advantageous. Thinner coating may be prone to defects. Thicker coatings may impede ion transport or contribute to a significant portion of the total mass or volume, which is undesirable.

In some applications, it may be advantageous for the protective coating to gradually change in composition. In this case, the internal stresses during cycling may be reduced and delamination of the coating prevented.

In some applications, it may be advantageous for the protective coating to contain micropores or mesopores. The presence of such pores may enhance the stability range of aqueous electrolytes. In addition, such pores may accommodate some of the volume changes within the active material particles, thus stabilizing the mechanical integrity of the electrode during cycling.

Many intercalation-type active materials are compatible with aqueous Li-ion batteries. Examples of such materials include but are not limited to various layered oxide(s), spinel(s), and olivines, to name a few. These include but are not limited to lithium cobalt oxide, LCO, lithium manganese oxide, LMO, lithium nickel manganese cobalt oxide, NMC, lithium iron phosphate, LFP, various other lithium phosphates and fluorophosphates, various lithium metal silicates, and many others. At the same time, many conversion-type active materials offer higher volumetric Li capacities than intercalation compounds. In addition, some of them exhibit a specific Li insertion/extraction potential, which may be advantageous for some applications. They are, however, mostly incompatible with aqueous electrolyte solutions because they either (at least partially) react with water or even (at least partially) dissolve in water (in some stage of charge or discharge). Examples of conversion-type active materials include but are not limited to selenium, lithium selenide, sulfur, lithium sulfide, various metal fluorides (such as copper fluoride, nickel fluoride, iron fluoride, cobalt fluoride, and others), various metal chlorides, various metal bromides, various metal tellurides, various oxides, various nitrides, various phosphides, sulfides, various antimonides, and others. Some other intercalation-type electrodes may similarly exhibit undesirable reactions with aqueous electrolytes, but offer advantages for some applications of aqueous Li-ion cells. Examples of such advantages include a favorable Li insertion/extraction potential, high volumetric or gravimetric capacity, or a high Li insertion rate.

In order to overcome the incompatibility of some favorable active materials with aqueous electrolytes, it may be advantageous in some applications to enclose them in one or more Li-ion permeable, but solvent impermeable protective shell(s).

Figure 12:
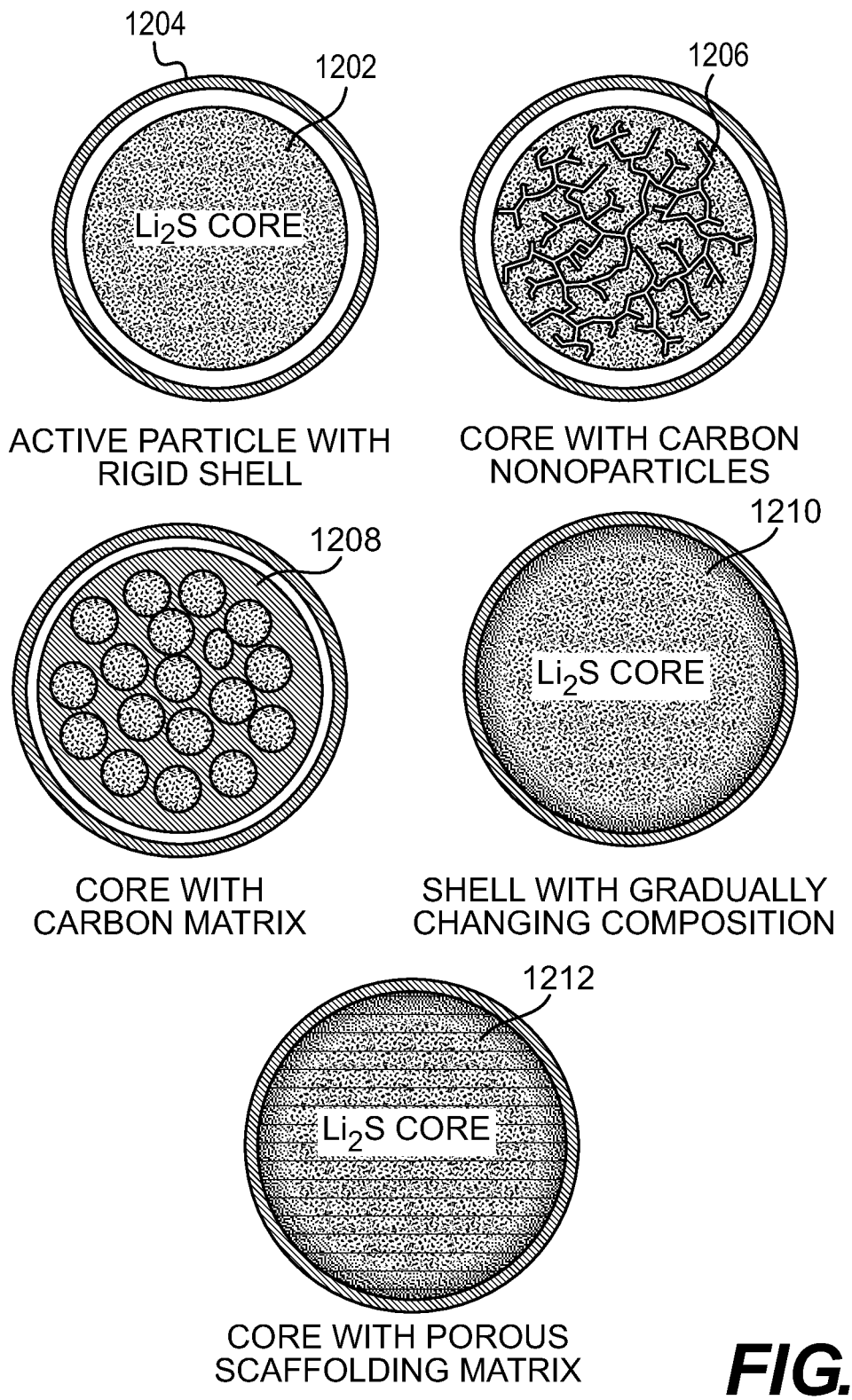
FIG. 12 is a cross-section view of different example particle designs incorporating one or more Li-ion permeable, but solvent impermeable protective shell(s).

FIG. 12 is a cross-section view of different example particle designs incorporating one or more Li-ion permeable, but solvent impermeable protective shell(s). As shown, each of the example composite core-shell nanoparticles shown here is generally composed of a $Li_2S$ core 1202 and a protective shell 1204 that is permeable to Li ions, but not permeable to $H_2O$. In some particle designs, the core may further include carbon nanoparticles 1206 to enhance electrical conductivity. In some particle designs, the core may further include a carbon matrix 1208 to enhance electrical conductivity. In some particle designs, the shell may be formed with a gradually changing composition 1210 as discussed above. In some particle designs, the core may further include a porous scaffolding matrix 1212 to enhance electrical conductivity, as well as mechanical stability.

In some applications (e.g., when the shells are electrically conductive), it may be advantageous for such shells to be deposited on individual particles prior to electrode assembling. In other applications (e.g., when the shells are electrically insulative or when the shells could be damaged during electrode processing), it may be advantageous for such shells to be deposited after the electrode assembling. In yet other applications, it may be advantageous to deposit the shells both times, before and additionally after electrode assembling, for example to ensure the lack of water-permeable defects or weak points within shells.

The use of many conversion-type active materials (such as metal fluorides, sulfur, selenium, lithium sulfide, or lithium selenide, as a few examples) in aqueous Li-ion battery cells has been conventionally impractical because of their reactivity with (or solubility in) water. However, the above core-shell structure applied to such particles (where shell(s) around the particles prevent water access to the conversion-type active material) may provide unique capabilities to such Li-ion aqueous cells.

Examples of the electrically conductive, Li-ion permeable and water impermeable shell materials include but are not limited to graphitic, disordered, or amorphous carbon. In some cases, it may be advantageous to use various metals (such as copper, nickel, or iron, to name a few) or various metal alloys as conductive coatings. It may be important, however, to make sure that the deposited metals are further protected against corrosion. It may be further important to make sure that the metal-coated electrodes are not exposed to potentials where undesirable phase transformation may take place. In some applications, it may be advantageous to use conductive polymers (such as polyaniline, for example) as a shell material.

Examples of electrically insulative shell materials include various oxides (such as aluminum oxide, zirconium oxide, silicon oxide, or various mixed oxides), various fluorides, various sulfides, various mixed ceramics, various polymers, various composites, and others. It may be important to make sure that the electrode is not exposed to the potential where undesirable phase transformation takes place. For example, titanium oxide should not be exposed to a potential below around 1.7 V vs. Li/Li+. It may also be important to make sure that the shell is compatible with the electrolyte employed (e.g., so that it does not dissolve in the electrolyte).

Similar to the protective shell(s) deposited for the purpose of preventing aqueous electrolyte decomposition, the shells deposited to protect the active material from undesirable reactions with water may contain multiple layers. These layers may similarly offer different functions. For example, in addition to protecting the active material from unfavorable interactions with aqueous electrolytes, these shells may provide one or more of the following functions: (i) enhance electrical connectivity between individual active particles; (ii) improve mechanical stability of the active particles; (iii) reduce volume changes within the active particles during cycling; and/or (iv) prevent aqueous electrolyte decomposition at extreme potentials (such as oxygen generation at a high potential of a cathode and hydrogen generation at a low potential of an anode).

As discussed above, one layer may, for example, assist in electrically connecting active particles of the electrode. In this case, the layer should be electrically conductive. Examples of materials for such a layer include but are not limited to a conductive carbon coating or a conductive metal coating, which should be stable in the potential range for the electrode of interest. Nickel is an example of such a metal suitable for some anodes. Aluminum is an example of such a metal suitable for some cathodes. A layer can also be deposited in order to assist in forming uniform coating of a subsequent (e.g., second) layer. Examples of materials for such a layer include but are not limited to metal(s), metal alloy(s), metal oxide(s), metal fluoride(s), metal sulfide(s), various other ceramic coatings, polymer(s), and composite(s), to name a few. It may be important that this material should also be stable in the potential range for the electrode of interest and not undergo undesirable phase transformation reactions. As discussed above, a layer can also be deposited in order to enhance the mechanical properties of the overall coating or enhance the mechanical stability of individual particles. Examples of materials for such a layer include but are not limited to carbon, metal(s), metal alloy(s), metal oxide(s), metal fluoride(s), various other ceramic coating(s), and composite(s), to name a few.

In some embodiments, active cathode particles comprising a conversion-type active material may be used in combination with anode active particles comprising an intercalation-type active material in a construction of aqueous Li-ion cells. In other applications, an intercalation-type active material can be used in the cathode and a conversion-type active material in the anode. In yet other applications, it may be advantageous to use conversion-type active materials for both electrodes or intercalation-type active materials for both electrodes. In still other applications, it may be advantageous to use both types of Li storing materials (intercalation and conversion) in one electrode (for example, when a high capacity conversion-type active material residing in the core of an active particle is surrounded by a lower capacity intercalation-type active material shell that stores Li ions and simultaneously protects the core from unfavorable interactions with an aqueous electrolyte).

All layers with a shell should be permeable to ion transport in order to provide energy storage capabilities to active particles.

In some applications, an overall thickness of the protective shell in the range of about 5 nm to about 500 nm may be advantageous. Thinner shells may be prone to defects. Thicker coatings may impede the ion transport or contribute to a significant portion of the total mass or volume, which is undesirable.

In some applications, it may be advantageous for the protective coating to gradually change in composition. In this case, the internal stresses during cycling may be reduced and delamination of the coating may be prevented.

In some applications, it may be advantageous for the conformal coating(s) on the electrode surface to both (i) protect some of the active material from reaction with the aqueous electrolyte and (ii) impede or prevent decomposition of the aqueous electrolyte at extreme electrode potentials (that is, prevent oxygen generation on the cathode surface or hydrogen generation on the anode surface). Methods described above may be used to produce pH-regulating layers on the surface of such shells to enhance the aqueous stability range. Similarly, other described methods may be used to deposit layers of electrically insulative (yet Li-ion permeable) material on the surface of such shells to further enhance the stability range of an aqueous electrolyte.

Various deposition techniques may be used for the conformal formation of layers or complete shells for various implementations described above (such as preventing electrolyte decomposition or preventing various undesirable reactions between the electrolyte and active material, to name a few). Examples include but are not limited to various vapor deposition techniques (such as chemical vapor deposition or CVD, atomic layer deposition or ALD, plasma-enhanced CVD, and plasma enhanced ALD, to name a few), various wet chemistry deposition techniques (such as layer-by-layer deposition, dip coating, solution precipitation, sol-gel, electroless deposition, and electro-deposition, to name a few) and other known techniques for the deposition of conformal layers on porous electrode substrates or particles.

For example, for the formation of a nickel metal coating, a CVD method may be used that involves thermal decomposition of a Nickel-biscyclopentadienyl (Nickelocene, $Ni(C_5H_5)_2$, or $NiCp_2$) precursor or nickel-carbonyl $(Ni(CO)_4)$ precursor at elevated temperatures (for example, within a temperature range of about 180-250° C.). In some applications (e.g., when a high degree of uniformity is required), it may be advantageous to conduct CVD at reduced pressures (e.g., under vacuum). For the formation of a carbon coating (if the core is thermally stable), a suitable polymer layer may be deposited on the surface of the particles (for example, by a solution precipitation method) and carbonized by annealing at elevated temperature (e.g., above about 400° C.). Alternatively, a CVD method may be employed that involves decomposition of hydrocarbons (such as acetylene) in a gaseous phase at elevated temperature (e.g., above 400° C.). A combination of such methods can also be employed.

Figure 13:
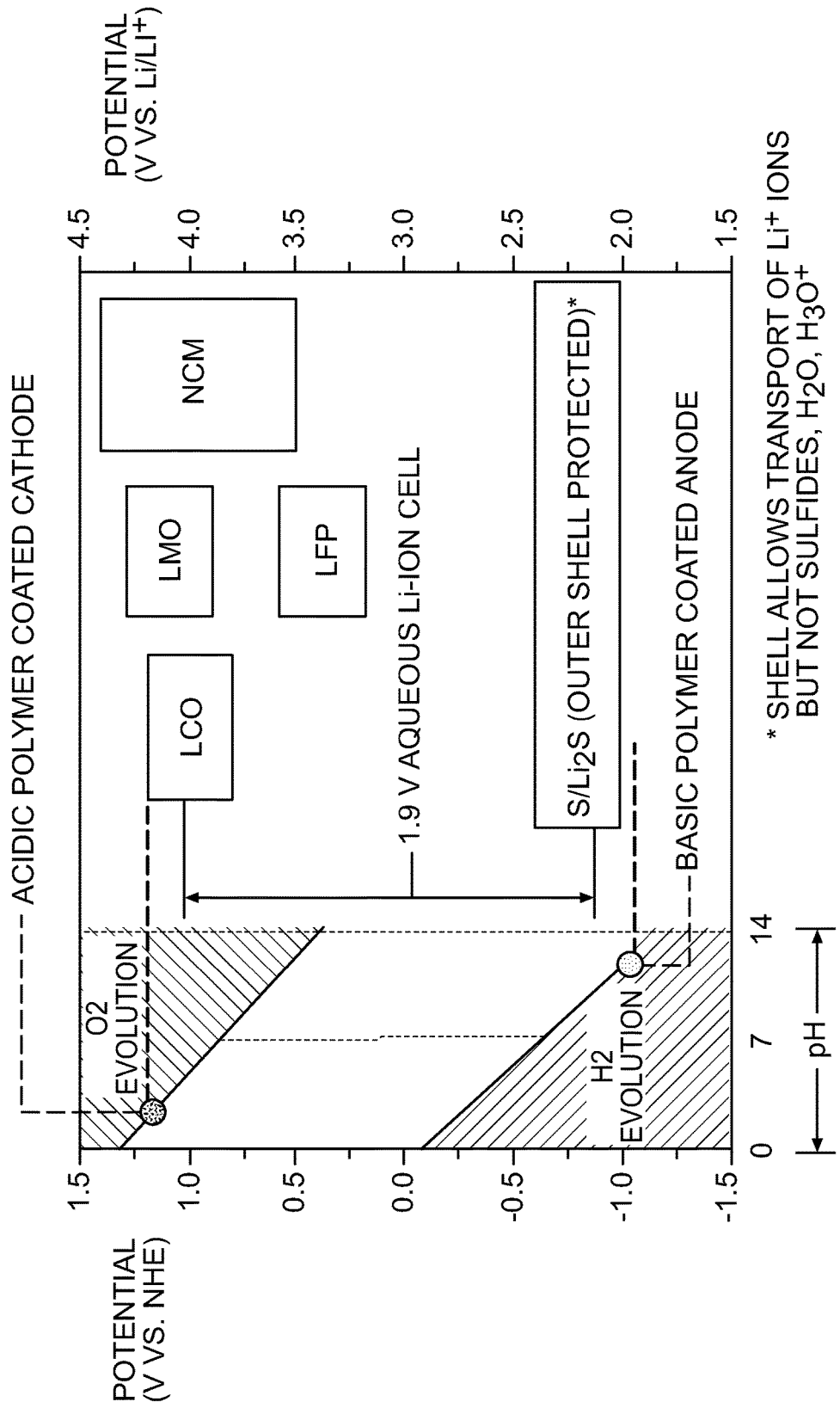
FIG. 13 provides an example of a high capacity aqueous Li-ion battery with a pH-modified anode and cathode.

FIG. 13 provides an example of a high capacity aqueous Li-ion battery with a pH-modified anode and cathode. Active cathode particles that comprise one of the common intercalation-type Li ion storing materials (such as lithium cobalt oxide, LCO, lithium manganese oxide, LMO, or lithium nickel manganese cobalt oxide, NMC) are used in this example cathode embodiment of Li-ion aqueous cells. In some cases (for example, when active particles are designed to have small volume changes during cycling and when their surface is protected from direct interactions with water, as previously described) active anode particles may comprise conversion-type active material(s). In the current example, the anode comprises environmentally-friendly low-cost sulfur (S)-based core-shell particles that may offer over two times higher volumetric capacity than the graphite currently used in conventional organic Li-ion cells. While some conventional designs have utilized S or $Li_2S$-comprising active material within a cathode (positive electrode) of a Li-ion or Li cell with an organic or ionic liquid electrolyte, the use of a shell-protected S or $Li_2S$-comprising active material as an anode material with an aqueous electrolyte is unique.

Many high capacity active material exhibit significant volume changes during insertion and extraction of Li ions. Such volume changes may induce defects in the functional conformal coatings previously described. Such defects may lead either to the undesirable reaction(s) of the aqueous electrolyte with active material or induce decomposition of the aqueous electrolyte, or both. It is therefore desirable for active particles as a whole to have relatively small volume changes during cycling, and to use such lower volume change particles in the construction of electrodes for aqueous Li-ion cells with enhanced cell voltage.

Accordingly, in various embodiments, each of the active material particles may include internal pores configured to accommodate volume changes in the active material during the storing and releasing of ions. When the active material is a high capacity material that changes volume by more than about 10% during insertion and extraction of ions (e.g., $Li^+$, $Na^+$, or $Mg^{2+}$ ions), the internal porosity of the active particles can be used to accommodate these volume changes so that charge/discharge cycles do not cause failure of the particle/protective layer interface, and do not induce formation of cracks in the protective layer(s). The overall porosity can be optimized to maximize the volumetric capacity, while avoiding the critical stresses that cause rapid composite failure or fatigue during battery cycling. In some applications, when a relatively brittle protective layer(s) is used or when the interface between the electrode particles and the protective layer(s) is relatively weak, then the presence of internal pores may prove to be beneficial even when active material changes volume by less than 10%.

Such porous particles may be produced by a so-called "bottom-up" approach, where the particles are built from smaller building blocks. One example to produce such porous active particles is utilization of an emulsion route. For example, active material in the form of nanoparticles can be dispersed in the suitable liquid. Binder (monomer or polymer) to keep the active nanoparticles together can be added to the liquid as well. Another type of additive (conductive particles, for example) can be dispersed jointly with the active material nanoparticles. Then, the suspension of the active particles with the binder may be emulsified in a second liquid immiscible with the first. The size of the porous particle may be controlled by the size of emulsion droplets. The droplets of the emulsion may then be solidified by solvent evaporation or monomer polymerization, yielding porous particles containing pores. In yet another example, porous particles may be produce by a so-called "balling" method, according to which smaller (for example, nanosize) particles are agglomerated together using a binder, which can be removed at later stages or transformed into a solid (e.g., a solid carbon, by carbonization of organic binders). In some examples, the particles can be further annealed in a controlled environment to induce sintering of individual nanoparticles. Another general route to produce such particles is a "top-down" approach where pores are induced in solid particles. In one example, the porous particles can be produced by first forming two or more compound-comprising particles, where one compound is leached out by dissolution or vaporization. In yet another example, porous particles may be produced by partial etching of solid particles.

In some embodiments, it may be advantageous for the active particles with internal porosity and volume-changing active material to be a composite of (i) a conductive material that does not exhibit volume changes (or exhibits very low volume changes) and (ii) volume-changing active material. In some cases, it may be further advantageous for the "low volume change" material to provide a rigid scaffold with internal pores partially filled with a volume changing material. This architecture of the particles allows one to further minimize the volume changes in such composite particles during cycling. Conductive carbon is an example of a material that may be used for such a scaffold.

Figure 14:
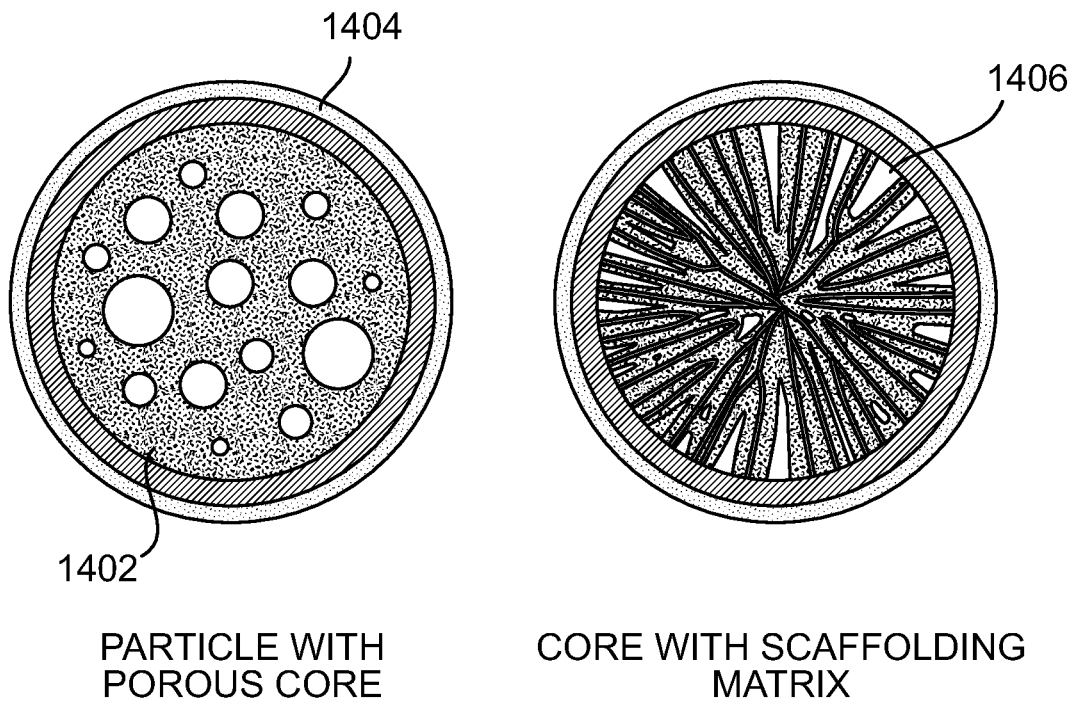
FIG. 14 provides an example of different porous particle designs containing a conversion-type active material (sulfur) that experiences volume changes upon Li insertion.
Figure 14:
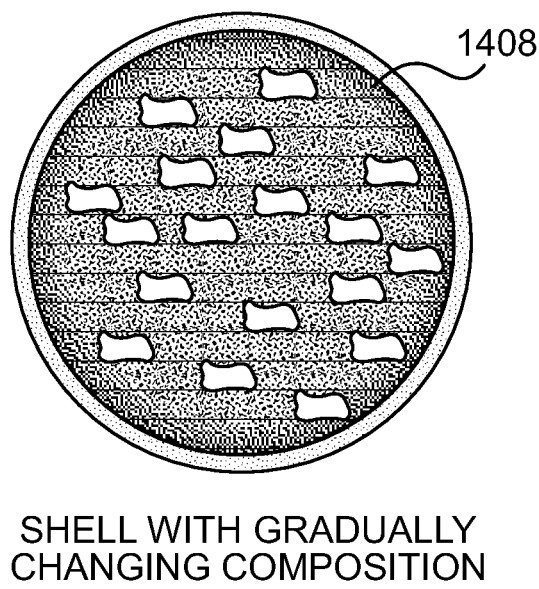

FIG. 14 provides an example of different porous particle designs containing a conversion-type active material (sulfur) that experiences volume changes upon Li insertion. As shown, the composite core-shell nanoparticles in this example are generally composed of a porous sulfur core 1402 and a protective shell 1404 permeable to Li ions, but not permeable to $H_2O$. In some designs, the core may further include a porous scaffolding matrix 1406 to enhance electrical conductivity, as well as mechanical stability. In some designs, the shell may be formed with a gradually changing composition 1408 as discussed above.

In some embodiments, it may be advantageous for the thickness of the features of the porous scaffold material to be small, e.g., in the range of about 0.3 to about 50 nm in size. Defective fragments of graphene (single or multi-layered with a thickness in the range from 0.3 to 50 nm, for example), activated carbon, carbon nanotubes, graphite ribbons, carbon fibers, carbon black, dendritic carbon particles, and various other carbon particles may serve as a scaffold material in some applications.

In some embodiments, it may be advantageous for the porous composite particles to be a nano-composite.

In some embodiments, it may be advantageous for the pores within the active particles to remain small, e.g., in the range of about 0.4 to about 10 nm.

In some embodiments, it may be advantageous for the "nodes" of the active material deposited within the scaffold to be small, e.g., in the range of about 0.5 to about 100 nm in size.

In some embodiments, it may be advantageous for the porous active material (or for the "nodes" of the active material deposited within the scaffold) to contain a secondary protective coating. In this case, if the conformal coating around the particles fails, this secondary coating may provide additional protection against undesirable side reactions with the electrolyte.

In some embodiments, conformal shells around the porous composite particles may serve to prevent volume changes in the porous particles. In some applications, it may be advantageous for the shell to have gradually changing porosity or gradually changing composition, or both (for example, to minimize stresses occurring during battery cycling and improve stability of the shell-core interface). It may further be advantageous for the shell to gradually emerge from the porous core, again to minimize internal stresses and improve mechanical stability of the composite active particles.

The high rate capability of an aqueous electrolyte can reduce the overall heating caused during use. In addition, high temperature performance will not cause significant irreversible degradation in an aqueous, pH-neutral Li-ion electrolyte. As such, battery structures provided herein require little or no cooling system. Because of the inherent safety of the cell, conventional packaging used to make battery modules and packs can be reduced, as they are no longer needed to serve the same protective role. Instead, the battery module and packs can be used (e.g., in electric vehicle applications) to protect passengers and absorb the energy of impact in the case of a severe crash (the electrolyte is safe). This may further improve the system-level performance of the provided energy storage solution based on a pH neutral electrolyte.

Figure 15:
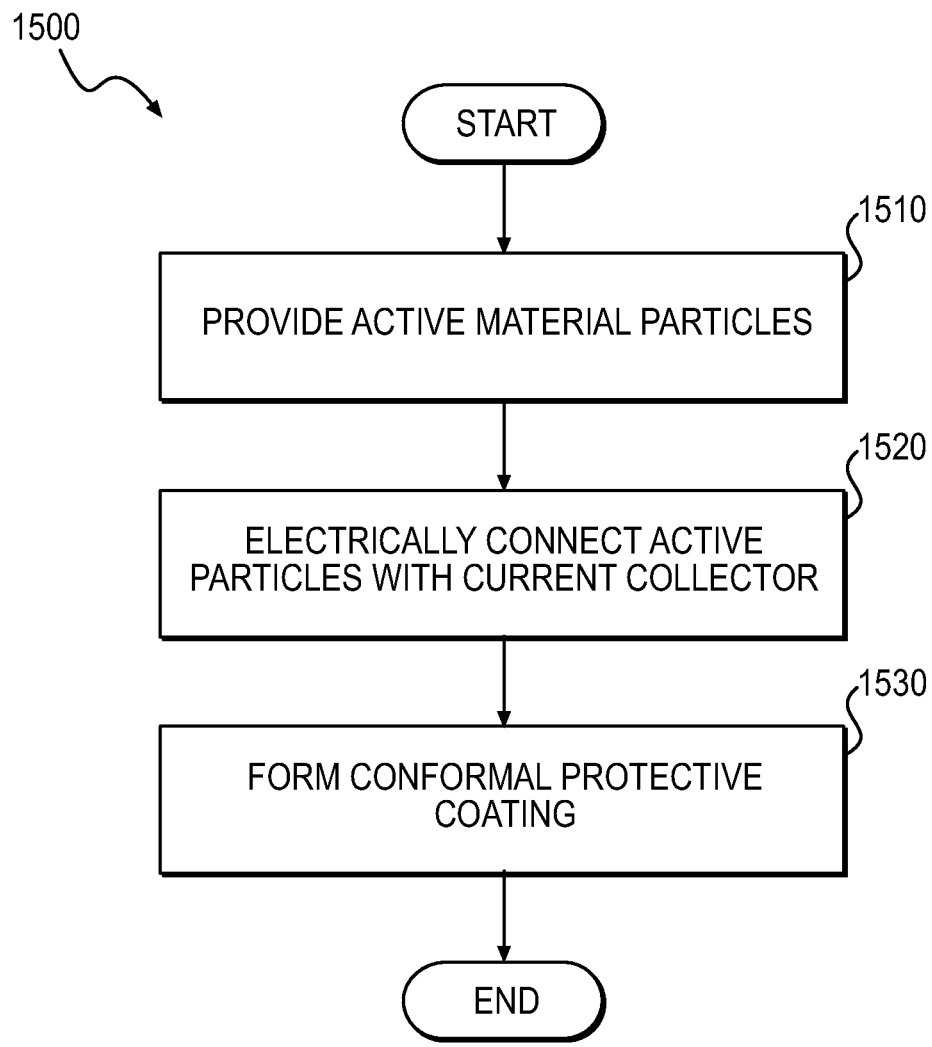
FIG. 15 is a flow chart illustrating an example method of fabricating a battery electrode composition comprising active particles.

FIG. 15 is a flow chart illustrating an example method of fabricating a battery electrode composition comprising active particles. As shown, the method 1500 may comprise, for example, providing active material particles to store and release ions during battery operation (block 1510) and electrically connecting the active particles with a current collector (block 1520). A conformal protective coating may then be formed on the electrode surface in such a way that the electrode remains porous while all (or at least a significant portion) of its open pore surface area is covered with such a coating (block 1530).

For connecting the active particle together during the electrode fabrication, the method may utilize a mixing process for mixing the active particles with a binder and an annealing process for annealing at an elevated temperature to cause solidification of the bonded particles in a particular shape. In some embodiments, the surface of the active particles may allow sintering particles together at elevated temperatures and thus not require a binder. In some embodiments, the surface coating of the active particles may deform during sintering or electrode preparation (e.g., during annealing or during application of a mechanical pressure) in such a way as to have a significantly smaller coating thickness in the areas where particles touch each other. This may be advantageous, for example, when the coating is electrically isolative, because in the particle-to-particle contact points a significantly thinner coating may provide, for example, paths for electron transport (for example, via quantum mechanical tunneling).

As previously discussed, in some embodiments, the coating or shell has gradually changing composition. This may be achieved, for example, by gradually changing the composition of the coating precursor.

In contrast to traditional Li-ion batteries, aqueous Li-ion cells can be manufactured in a small, commodity, cylindrical form factor, which may be advantageous for electric vehicle applications. For example, such a multi-cell battery can be designed to have a shape that fits the space available, rather than building the car around a large prismatic design. Small cylindrical cells using steel casings can be used to provide tremendous rigidity to the module and pack, and in turn carry loads normally borne by the chassis. With traditional Li-ion cells, such an approach would never be used, since damaging the cells in an accident would lead to nearly certain thermal runaway. This approach, however, is made feasible by the aqueous Li-ion cells disclosed herein.

In some embodiments, it may be advantageous for the thicker electrodes of aqueous Li-ion batteries to contain pores (for example, pores perpendicular to the electrode surface) to provide channels for faster Li-ion electrolyte diffusion through the electrode. The pore width may range, for example, from as little as about 20 nm to as much as about 500,000 nm (0.5 mm). This structure of the porous electrode may be particularly advantageous if the electrode thickness is in the range of about 0.2 mm to about 5 mm. In this case, having the "channel" pores within the electrode may significantly enhance the rate or power performance of such aqueous Li-ion batteries.

In some embodiments, it may be advantageous to embed a porous metal (e.g., a metal or conductive carbon foam or mesh) current collector within the electrode. In this case, both mechanical properties of the electrode and electrical conductivity of the electrode will be enhanced. It is noted, however, that it some embodiments (e.g., in cases when the metal current collector does not exhibit high over-potential for water decomposition), it may be advantageous to deposit a conformal protective coating on all of the open internal surface area of the electrode, including the current collector.

Compared to conventional Li-ion batteries, the dramatic cost reduction of the provided aqueous Li ion technology also comes from different manufacturing technology that could be enabled by the significantly higher ionic conductivity of aqueous Li-ion electrolytes. Because aqueous electrolytes offer higher conductivity than those based on the carbonate solvents used in commercial Li-ion cells, the electrodes can be made about 0.5-5 millimeters thick while maintaining acceptably high power characteristics. This is because high electrical conductivity is relatively easy to maintain and because relatively slow (e.g., less than around "2C") charging rate in graphite anode-based commercial Li-ion cells is limited by the low solid electrolyte interphase stability, high charge-transfer resistance, and Li plating (due to low lithiated graphite potential). All these factors disappear or become greatly reduced (charge transfer resistance) in aqueous Li-ion systems. As a result, with thick electrodes, bulk (molding) rather than surface (coating) manufacturing methods may be used in some embodiments of aqueous Li-ion batteries. In some applications, it may be advantageous to use a process that is akin to alkaline batteries rather than traditional Li-ion cells.

Figure 16:
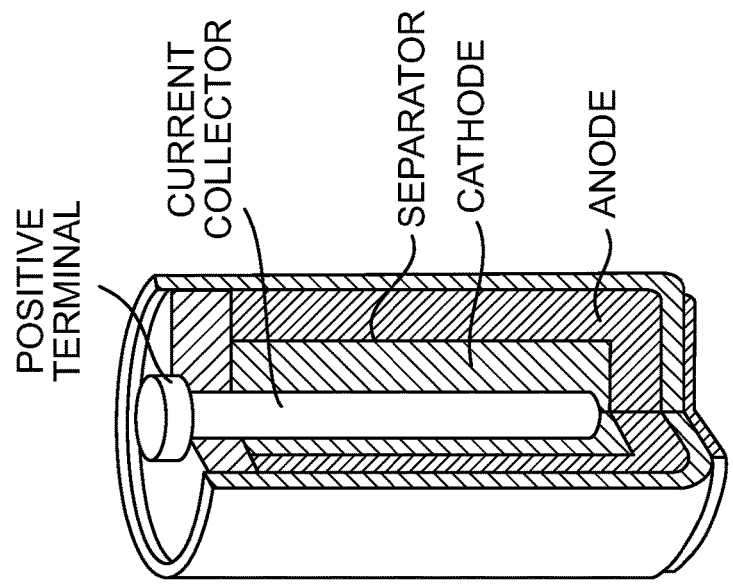
FIG. 16 shows a comparison of two cell constructions, including a conventional Li-ion cell side by side an aqueous Li-ion cell as described herein.
Figure 16:
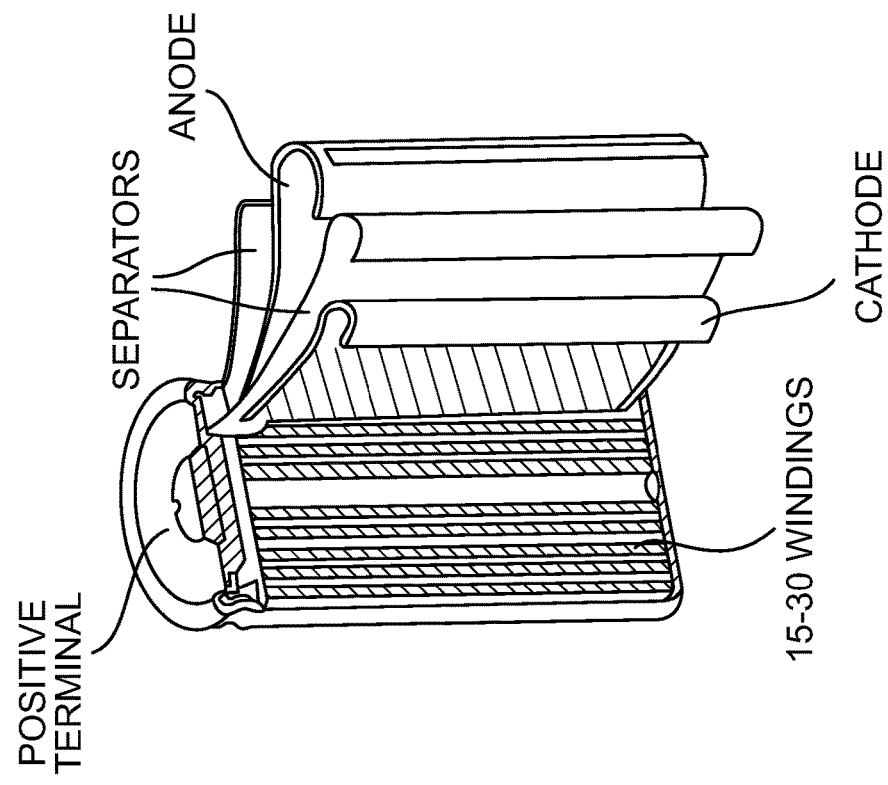

FIG. 16 shows a comparison of two cell constructions, including a conventional Li-ion cell side by side an aqueous Li-ion cell as described herein. A traditional Li-ion cell in a cylindrical 18×65 mm case utilizes anywhere from 15 to 30 winds of a very thin electrode to occupy that volume. In order to create the winding, great care is taken to cast the active material onto thin copper and aluminum foils which are then sliced into sections nearly three feet long, stacked with two separators, and wound with extreme precision to ensure all edges are aligned. Any misalignment or variation in the amount of active material along the three-foot foil can lead to electrical short circuits and thermal runaway. As a result, these processes require extremely high precision and many additional quality control steps which result in a relatively high cost of assembly.

There are also technical limitations in this process. For example, the minimum thickness of Cu and Al that must be used to keep from tearing during assembly is approximately 10 µm. Much of this foil, however, is unnecessary from an electrical conductivity standpoint, adding little to the performance of the cell other than allowing for robust assembly. The copper and aluminum conductors in a cell make up 5 g of a 45 g cell or about 11% of the total mass. The separator, while light, takes up 7% of the volume. The case adds 12-14% by volume and 10% by mass. Much of this is essentially dead weight, as well as dead volume and unnecessary cost, which are compared below.

This construction methodology leaves only 60-65% of volume available for the functional active electrodes in the cell. The reason for this complexity and inefficiency stems directly from the need to keep electrode thicknesses at or below 100 µm to allow sufficient ionic conductivity in the electrode during operation. The need for electric vehicles, for example, to operate at low temperatures exaggerates these limitations even further, as the ionic conductivity of the commercial organic electrolytes often drops tenfold when operating at −20° C. Finally, due to the high sensitivity of cell performance to moisture residues, extensive drying and expensive glovebox-operated electrolyte filling/sealing protocols must be employed.

In contrast, assembly for the provided aqueous Li ion technology is dramatically simpler. As in alkaline cells, a cylindrical pellet of anode material may be prepared, typically about 0.5-8 mm thick depending on the diameter of the battery, and inserted into the casing from the open top end. The pellet is electrically conducting and free standing, and makes contact with the casing, which serves as a current collector and negative terminal for the cell. Next a cylindrical separator is inserted, after which a cylindrical cathode pellet, followed by the addition of the electrolyte, the top cap, and the positive electrode pin (which occupies the same space and doubles up functionally for the traditional central vent tube). Once firmly pressed, the cell is crimped in a manner similar to conventional cells.

Unlike conventional Li-ion cells, however, the entire process can take place in a humid environment and does not require the construction of expensive dry rooms. The simple construction is not only cheaper and faster to manufacture, but carries additional safety benefits and enhanced process robustness. In traditional Li-ion construction, the separator spans nearly three feet, and two layers are required for the winding. As a result, engineers have pushed the separator to be as thin as possible to minimize its inactive volume— anywhere from 16-25 µm in typical cells. This, however, reduces the safety of the cell, as the thinner separators are more susceptible to internal short circuits due to defects, particulate contaminants, and dendrites. A penetration through the separator during charging is a common cause of sudden thermal runaway in Li-ion systems. To combat the problem, automotive cells use thicker separators—typically, 25 µm and thicker—but this reduces the energy density of their cells and increases the $/kWh cell costs. In the construction provided herein, however, the separator length is less than about $\frac{1}{20}^{th}$ of that in a conventional cell, and can therefore be made thicker to improve safety and eliminate unwanted internal short circuits with minimal impact on cost or energy density.

In contrast to traditional alkaline cells, in some embodiments, it may be advantageous to use more than one positive or more than one negative electrode in the construction of the aqueous Li-ion cells. In this case, the thickness of each electrode may be kept relatively small (for example, about 0.2-1 mm), while the overall power performance may be high, allowing fast charging (within an hour or faster) in cells with a relatively large diameter of more than 10 mm.

In some embodiments, it may be advantageous to produce planar cells, instead of cylindrical cells. In this case, cells may be packed together more efficiently, providing less "free volume" space between individual cells.

Figure 17:
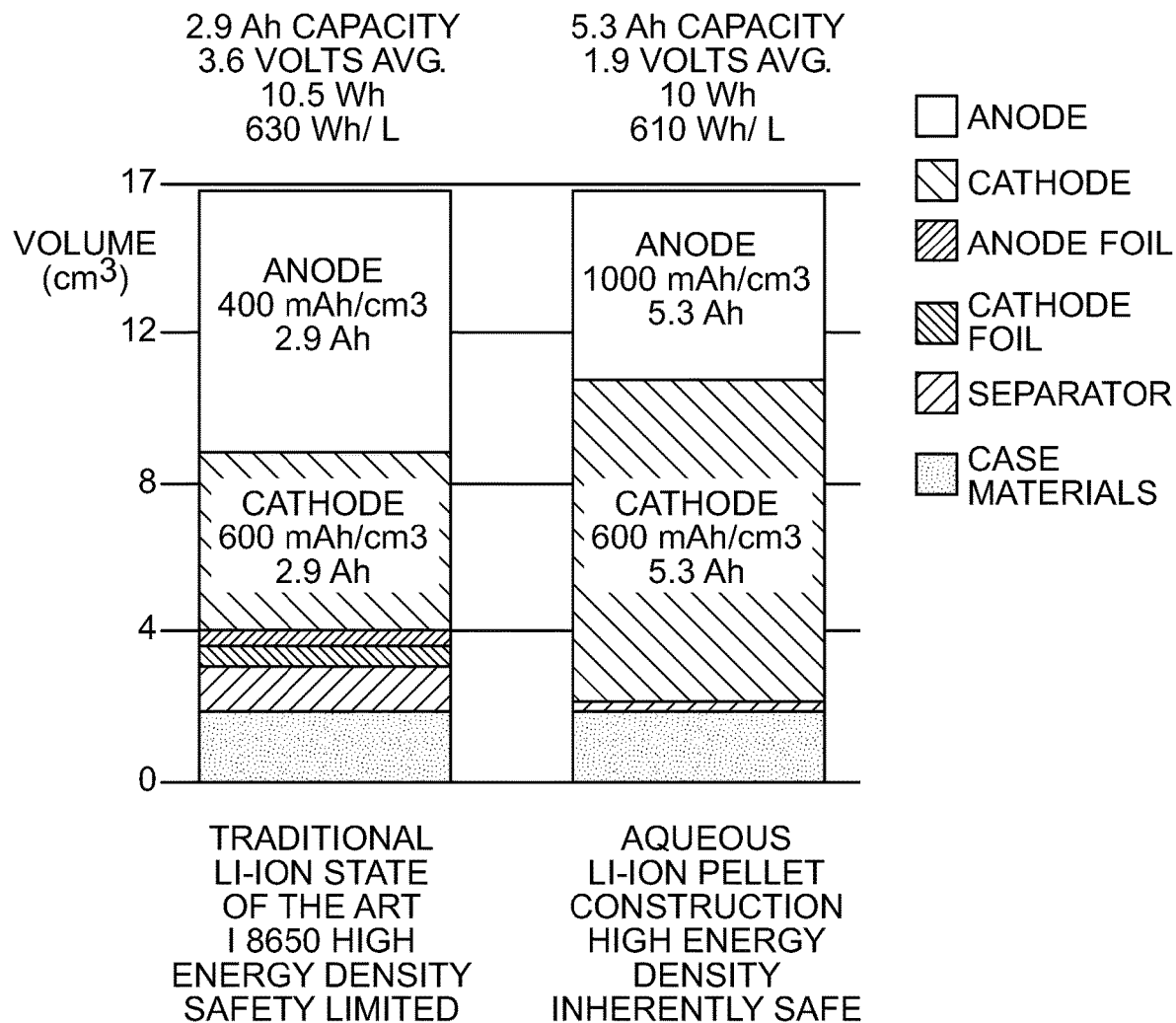
FIG. 17 shows select performance characteristics of the two cell constructions, including a conventional Li-ion cell side by side an aqueous Li-ion cell as described herein.

FIG. 17 shows select performance characteristics of the two cell constructions, including a conventional Li-ion cell side by side an aqueous Li-ion cell as described herein. Deconstruction of a mass-produced, 2.9 Ah, 3.6 V traditional Li-ion cell showed the anode and cathode capacity with a volumetric capacity to be 400 and 600 mAh/cc, respectively. Because certain example embodiments may utilize a similar, traditional cathode with a surface modification technique, they may also reach 600 mAh/cc in well-designed cells. Capacity of pure $Li_2S$ is 1,931 mAh/cc. Conservatively assuming that 48% of the volume will be occupied by the non-active components and pores, it can be estimated that the protected S-based anode capacity may approach 1,000 mAh/cc for this example of an aqueous Li-ion cell. Since a different manufacturing technology can be employed for the fabrication of aqueous Li-ion cells, the volume occupied by the separator may be reduced, and the Al and Cu foils may be eliminated. As a result, for an 18650-volume-equivalent aqueous Li-ion cell with such 1000 mAh/cc anode and 600 mAh/cc cathode, it may be estimated that a 5.3 Ah capacity may be achieved, along with an average voltage of, for example, 1.9 V, and an energy density of 610 Wh/L (200 Wh/kg). This is around 90% of traditional high energy Li-ion cells, but at substantially lower cost.

The forgoing description is provided to enable any person skilled in the art to make or use embodiments of the present invention. It will be appreciated, however, that the present invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the invention.

What is claimed is:

1. A metal-ion battery composition, comprising:
   anode and cathode electrodes, wherein at least one of the anode and cathode electrodes comprises a plurality of active material particles capable of storing and releasing ions during battery operation;
   a separator electrically separating the anode electrode and the cathode electrode; and
   an electrolyte ionically coupling the anode electrode and the cathode electrode, wherein the electrolyte comprises an aqueous metal-ion electrolyte ionically interconnecting the plurality of active material particles,
   wherein the plurality of active material particles comprises a conformal, metal-ion permeable coating that is separate from the separator and arranged at an interface between the plurality of active material particles and the aqueous metal-ion electrolyte, whereby the conformal, metal-ion permeable coating is electrically insulative and ionically conductive so as to impede water decomposition at the at least one of the anode and cathode electrodes by enhancing an over-potential for water decomposition at the interface by at least 0.25 V.

2. The metal-ion battery composition of claim 1, wherein the conformal, metal-ion permeable coating has an average thickness is in the range of about 10 nm to about 500 nm.

3. The metal-ion battery composition of claim 1, wherein the conformal, metal-ion permeable coating encases each of the plurality of active material particles individually.

4. The metal-ion battery composition of claim 1, wherein the conformal, metal-ion permeable coating encases the plurality of active material particles as a whole.

5. The metal-ion battery composition of claim 1, wherein the conformal, metal-ion permeable coating is a composite coating comprising a plurality of layers.

6. The metal-ion battery composition of claim 5, wherein two or more layers among the plurality of layers include different compositions.

7. The metal-ion battery composition of claim 5, wherein the plurality of layers comprises an outer layer formed from an electrical insulator material for preventing electrochemical reduction of the aqueous metal-ion electrolyte on the anode electrode or preventing electrochemical oxidation of the aqueous metal-ion electrolyte on the cathode electrode by accommodating a portion of a voltage drop between the anode electrode and the cathode electrode and thereby reducing a voltage drop across the aqueous metal-ion electrolyte.

8. The metal-ion battery composition of claim 5, wherein the plurality of layers comprises a layer selected from the group consisting of:
   an electrically conductive layer for electrically connecting the plurality of active material particles;
   an interfacing layer for enhancing uniformity or adhesion of another layer;
   a mechanically stable layer for enhancing mechanical stability of the conformal, metal-ion permeable coating; and
   a supplemental protection layer for preventing electrochemical reduction of the aqueous metal-ion electrolyte on the anode electrode or preventing electrochemical oxidation of the aqueous metal-ion electrolyte on the cathode electrode.

9. The metal-ion battery composition of claim 1, wherein the conformal, metal-ion permeable coating comprises, as a single or outer layer, a chemically-linked, polymeric coating containing one or more pH-regulating functional groups.

10. The metal-ion battery composition of claim 9, wherein the one or more pH-regulating functional groups comprise an acidic functional group for decreasing the pH of the aqueous metal-ion electrolyte at the interface of the cathode electrode to prevent electrochemical oxidation of the aqueous metal-ion electrolyte.

11. The metal-ion battery composition of claim 9, wherein the one or more pH-regulating functional groups comprise a basic functional group for increasing the pH of the aqueous metal-ion electrolyte at the interface of the anode electrode to prevent electrochemical reduction of the aqueous metal-ion electrolyte.

12. The metal-ion battery composition of claim 1, wherein the conformal, metal-ion permeable coating is formed on the at least one of the anode and cathode electrodes prior to a formation cycle of a cell comprising the metal-ion battery composition.

13. The metal-ion battery composition of claim 1, wherein the conformal, metal-ion permeable coating is at least partially formed on the at least one of the anode and cathode electrodes by decomposition of one or more additives to the aqueous metal-ion electrolyte during a formation cycle of a cell comprising the metal-ion battery composition.

14. The metal-ion battery composition of claim 5,
   wherein the plurality of layers comprises a first layer that is electrically insulative, and
   wherein the plurality of layers comprises a second layer that comprises (i) a carbon or (ii) one or more metals that enhance the over-potential for water decomposition by at least 0.25 V.

15. The metal-ion battery composition of claim 1, wherein the conformal, metal-ion permeable coating comprises a plurality of pores having an average pore size in the range of about 0.5 nm to about 10 nm.

16. The metal-ion battery composition of claim 1, wherein the plurality of active material particles are composites with a core-shell structure.

17. The metal-ion battery composition of claim 16, wherein a core of each active material particle is a nanocomposite comprising active material and at least one of (i) pores, (ii) a carbon additive, or (iii) a carbon scaffolding matrix.

18. The metal-ion battery composition of claim 17, wherein the carbon scaffolding matrix is porous with an average pore size in the range of about 0.5 nm to about 20 nm, and wherein the carbon scaffolding matrix contains active material that at least partially fills the pores.

19. The metal-ion battery composition of claim 16, wherein a shell of each active material particle is a nanocomposite comprising at least one of (i) an electrical conductive layer, (ii) a mechanical stability layer, or (iii) a water impermeability layer.

20. The metal-ion battery composition of claim 1, wherein the metal-ion battery composition corresponds to an aqueous Li-ion or Na-ion battery.

21. The metal-ion battery composition of claim 1, wherein the conformal, metal-ion permeable coating comprises, as a single or outer layer, a chemically-linked, polymeric coating.

* * * * *